United States Patent

Tanaka et al.

[11] Patent Number: 5,881,037
[45] Date of Patent: Mar. 9, 1999

[54] RECORDING MEDIUM, RECORDING METHOD AND APPARATUS, AND REPRODUCTION METHOD AND APPARATUS

[75] Inventors: Shin-ichi Tanaka, Kyoto; Toshiyuki Shimada, Kobe; Tadashi Kojima; Koichi Hirayama, both of Yokohama, all of Japan

[73] Assignees: Kabushiki Kaisha Toshiba, Kanagawa; Matsushita Electric Industrial Co., Ltd., Osaka, both of Japan

[21] Appl. No.: 887,944

[22] Filed: Jul. 1, 1997

Related U.S. Application Data

[63] Continuation of Ser. No. 627,605, Apr. 2, 1996, abandoned.

[30] Foreign Application Priority Data

Apr. 4, 1995 [JP] Japan .................................. 7-078988

[51] Int. Cl.$^6$ .............................. G11B 7/00; G11B 7/24; H04N 5/76
[52] U.S. Cl. .......................... 369/48; 369/59; 369/275.3; 360/48
[58] Field of Search ........................... 369/48, 59, 275.3, 369/49, 47; 360/72.2, 37.1, 49, 27, 73.11, 48; 370/105.4, 105.1, 106, 114

[56] References Cited

U.S. PATENT DOCUMENTS

| | | | |
|---|---|---|---|
| 4,142,209 | 2/1979 | Hedlund et al. | 369/275.3 |
| 4,323,931 | 4/1982 | Jacoby | 360/40 |
| 4,501,000 | 2/1985 | Immink et al. | 375/25 |
| 4,703,494 | 10/1987 | Ozaki et al. | 375/292 |
| 4,728,929 | 3/1988 | Tanaka | 341/73 |
| 5,151,699 | 9/1992 | Moriyama | 341/56 |
| 5,276,674 | 1/1994 | Tanaka | 369/275.3 |
| 5,333,126 | 7/1994 | Fukuda et al. | 369/59 |
| 5,373,497 | 12/1994 | Hanson | 369/275.1 |

FOREIGN PATENT DOCUMENTS

| | | |
|---|---|---|
| 0178813 | 4/1986 | European Pat. Off. . |
| 0193153 | 9/1986 | European Pat. Off. . |
| 0347934 | 12/1989 | European Pat. Off. . |
| 0415853 | 3/1991 | European Pat. Off. . |
| 0511498 | 11/1992 | European Pat. Off. . |
| 0545516 | 6/1993 | European Pat. Off. . |
| 0577402 | 1/1994 | European Pat. Off. . |
| 0597443 | 5/1994 | European Pat. Off. . |
| 0624876 | 11/1994 | European Pat. Off. . |
| 0625828 | 11/1994 | European Pat. Off. . |
| 0673029 | 9/1995 | European Pat. Off. . |

(List continued on next page.)

OTHER PUBLICATIONS

A copy of an International Search Report issued in counterpart PCT application PCT/JP96/00878.
A copy of an International Search Report issued in counterpart PCT application PCT/JP96/00880.

(List continued on next page.)

Primary Examiner—Nabil Hindi
Attorney, Agent, or Firm—Greenblum & Bernstein, P.L.C.

[57] ABSTRACT

A digital video disk stores data codes and multifunctional synchronization codes in a data structure. The synchronization codes contain type information code identifying whether the synchronization code is located in a code sequence at the beginning of the data block, the beginning of a data block sector other than the first sector in the data block, the beginning of a line, or the middle of a line. The type information is expressed by two alternative patterns, type information code 1 and type information code 2, expressing the same information and differing in the number of is in the 5-bit sequence, i.e., an odd or even number of 1s. Which one of the two type information code pattern is used is selected according to the DSV so as to minimize bias in the dc component of the frame following the synchronization code.

35 Claims, 20 Drawing Sheets

FOREIGN PATENT DOCUMENTS

| | | |
|---|---|---|
| 4304267 | 8/1993 | Germany . |
| 63-56610 | 5/1983 | Japan . |
| 60-106254 | 6/1985 | Japan . |
| 60-114053 | 6/1985 | Japan . |
| 62-281523 | 12/1987 | Japan . |
| 7-75049 | 3/1995 | Japan . |
| 239249 | 1/1995 | Taiwan . |
| 2061575 | 5/1981 | United Kingdom . |

OTHER PUBLICATIONS

Pp. 19–27 of a Standard of Electronic Industries Association of Japan publication entitled DAT Cassette System, Part 1: Dimension and Characteristics (EIAJ CP–2305), Published (in English) by Electronic Industries Association of Japan (1989).

A Copy of an International Search Report issued in counterpart PCT application PCT/JP96/00879.

Patent Abstracts of Japan, vol. 12, No. 174 (p–612), May 24, 1988.

Patent Abstracts of Japan, vol. 9, No. 270 (E–353), Oct. 26, 1985.

Patent Abstracts of Japan, vol. 9, No. 258 (E–350), Oct. 16, 1985.

English Language Abstract of SHO 63–56610.

"Sequence–state Methods for Run–Length–Limited Coding", by P.A. Franaszek, published on pp. 376–383 of IBM J. Res. Develop. in Jul., 1970.

Fig.2

8/15 CONVERSION TABLE

| DATA WORD | CODE WORD | DATA WORD | CODE WORD | DATA WORD | CODE WORD |
|---|---|---|---|---|---|
| 0 | 000000000100001 | 50 | 000010000000010 | 100 | 000100010010000 |
| 1 | 000000000100010 | 51 | 000010000000100 | 101 | 000100010010001 |
| 2 | 000000000100100 | 52 | 000010000001000 | 102 | 000100010010010 |
| 3 | 000000001000000 | 53 | 000010000001001 | 103 | 000100100000000 |
| 4 | 000000001000001 | 54 | 000010000010000 | 104 | 000100100000001 |
| 5 | 000000001000010 | 55 | 000010000010001 | 105 | 000100100100010 |
| 6 | 000000001000100 | 56 | 000010000010010 | 106 | 000100100000100 |
| 7 | 000000001001000 | 57 | 000010000100000 | 107 | 000100100001000 |
| 8 | 000000001001001 | 58 | 000010000100001 | 108 | 000100100001001 |
| 9 | 000000010000000 | 59 | 000010000100010 | 109 | 000100100010000 |
| 10 | 000000010000001 | 60 | 000010000100100 | 110 | 000100100010001 |
| 11 | 000000010000010 | 61 | 000010001000000 | 111 | 000100100010010 |
| 12 | 000000010000100 | 62 | 000010001000001 | 112 | 000100100100000 |
| 13 | 000000010001000 | 63 | 000010001000010 | 113 | 000100100100001 |
| 14 | 000000010001001 | 64 | 000010001000100 | 114 | 000100100100010 |
| 15 | 000000010010000 | 65 | 000010001001000 | 115 | 000100100100100 |
| 16 | 000000010010001 | 66 | 000010001001001 | 116 | 001000000000010 |
| 17 | 000000010010010 | 67 | 000010010000000 | 117 | 001000000000100 |
| 18 | 000000100000000 | 68 | 000010010000001 | 118 | 001000000001000 |
| 19 | 000000100000001 | 69 | 000010010000010 | 119 | 001000000001001 |
| 20 | 000000100000010 | 70 | 000010010000100 | 120 | 001000000010000 |
| 21 | 000000100000100 | 71 | 000010010001000 | 121 | 001000000010001 |
| 22 | 000000100001000 | 72 | 000010010001001 | 122 | 001000000010010 |
| 23 | 000000100001001 | 73 | 000010010010000 | 123 | 001000000100000 |
| 24 | 000000100010000 | 74 | 000010010010001 | 124 | 001000000100001 |
| 25 | 000000100010001 | 75 | 000010010010010 | 125 | 001000000100010 |
| 26 | 000000100010010 | 76 | 000100000000001 | 126 | 001000000100100 |
| 27 | 000000100100000 | 77 | 000100000000010 | 127 | 001000001000000 |
| 28 | 000000100100001 | 78 | 000100000000100 | 128 | 001000001000001 |
| 29 | 000000100100010 | 79 | 000100000001000 | 129 | 001000001000010 |
| 30 | 000000100100100 | 80 | 000100000001001 | 130 | 001000001000100 |
| 31 | 000001000000001 | 81 | 000100000010000 | 131 | 001000001001000 |
| 32 | 000001000000010 | 82 | 000100000010001 | 132 | 001000001001001 |
| 33 | 000001000000100 | 83 | 000100000010010 | 133 | 001000010000000 |
| 34 | 000001000001000 | 84 | 000100000100000 | 134 | 001000010000001 |
| 35 | 000001000001001 | 85 | 000100000100001 | 135 | 001000010000010 |
| 36 | 000001000010000 | 86 | 000100000100010 | 136 | 001000010000100 |
| 37 | 000001000010001 | 87 | 000100000100100 | 137 | 001000010001000 |
| 38 | 000001000010010 | 88 | 000100001000000 | 138 | 001000010001001 |
| 39 | 000001000100000 | 89 | 000100001000001 | 139 | 001000010010000 |
| 40 | 000001000100001 | 90 | 000100001000010 | 140 | 001000010010001 |
| 41 | 000001000100010 | 91 | 000100001000100 | 141 | 001000010010010 |
| 42 | 000001000100100 | 92 | 000100001001000 | 142 | 001000100000000 |
| 43 | 000001001000000 | 93 | 000100001001001 | 143 | 001000100000001 |
| 44 | 000001001000001 | 94 | 000100010000000 | 144 | 001000100000010 |
| 45 | 000001001000010 | 95 | 000100010000001 | 145 | 001000100000100 |
| 46 | 000001001000100 | 96 | 000100010000010 | 146 | 001000100001000 |
| 47 | 000001001001000 | 97 | 000100010000100 | 147 | 001000100001001 |
| 48 | 000001001001001 | 98 | 000100010001000 | 148 | 001000100010000 |
| 49 | 000010000000001 | 99 | 000100010001001 | 149 | 001000100010001 |

Fig.3

8/15 CONVERSION TABLE

| DATA WORD | CODE WORD | DATA WORD | CODE WORD | DATA WORD | CODE WORD |
|---|---|---|---|---|---|
| 150 | 001000100010010 | 200 | 010000100000010 | 250 | 010010010000100 |
| 151 | 001000100100000 | 201 | 010000100000100 | 251 | 010010010001000 |
| 152 | 001000100100001 | 202 | 010000100001000 | 252 | 010010010001011 |
| 153 | 001000100100010 | 203 | 010000100001001 | 253 | 010010010010000 |
| 154 | 001000100100100 | 204 | 010000100010000 | 254 | 010010010010001 |
| 155 | 001001000000001 | 205 | 010000100010001 | 255 | 010010010010010 |
| 156 | 001001000000010 | 206 | 010000100010010 | | |
| 157 | 001001000000100 | 207 | 010000100100000 | | |
| 158 | 001001000001000 | 208 | 010000100100001 | | |
| 159 | 001001000001001 | 209 | 010000100100010 | | |
| 160 | 001001000010000 | 210 | 010000100100100 | | |
| 161 | 001001000010001 | 211 | 010001000000001 | | |
| 162 | 001001000010010 | 212 | 010001000000010 | | |
| 163 | 001001000100000 | 213 | 010001000000100 | | |
| 164 | 001001000100001 | 214 | 010001000001000 | | |
| 165 | 001001000100010 | 215 | 010001000001001 | | |
| 166 | 001001000100100 | 216 | 010001000010000 | | |
| 167 | 001001001000000 | 217 | 010001000010001 | | |
| 168 | 001001001000001 | 218 | 010001000010010 | | |
| 169 | 001001001000010 | 219 | 010001000100000 | | |
| 170 | 001001001000100 | 220 | 010001000100001 | | |
| 171 | 001001001001000 | 221 | 010001000100010 | | |
| 172 | 001001001001001 | 222 | 010001000100100 | | |
| 173 | 010000000000100 | 223 | 010001001000000 | | |
| 174 | 010000000001000 | 224 | 010001001000001 | | |
| 175 | 010000000001001 | 225 | 010001001000010 | | |
| 176 | 010000000010000 | 226 | 010001001000100 | | |
| 177 | 010000000010001 | 227 | 010001001001000 | | |
| 178 | 010000000010010 | 228 | 010001001001001 | | |
| 179 | 010000000100000 | 229 | 010010000000001 | | |
| 180 | 010000000100001 | 230 | 010010000000010 | | |
| 181 | 010000000100010 | 231 | 010010000000100 | | |
| 182 | 010000000100100 | 232 | 010010000001000 | | |
| 183 | 010000001000000 | 233 | 010010000001001 | | |
| 184 | 010000001000001 | 234 | 010010000010000 | | |
| 185 | 010000001000010 | 235 | 010010000010001 | | |
| 186 | 010000001000100 | 236 | 010010000010010 | | |
| 187 | 010000001001000 | 237 | 010010000100000 | | |
| 188 | 010000001001001 | 238 | 010010000100001 | | |
| 189 | 010000010000000 | 239 | 010010000100010 | | |
| 190 | 010000010000001 | 240 | 010010000100100 | | |
| 191 | 010000010000010 | 241 | 010010001000000 | | |
| 192 | 010000010000100 | 242 | 010010001000001 | | |
| 193 | 010000010001000 | 243 | 010010001000010 | | |
| 194 | 010000010001001 | 244 | 010010001000100 | | |
| 195 | 010000010010000 | 245 | 010010001001000 | | |
| 196 | 010000010010001 | 246 | 010010001001001 | | |
| 197 | 010000010010010 | 247 | 010010010000000 | | |
| 198 | 010000100000000 | 248 | 010010010000001 | | |
| 199 | 010000100000001 | 249 | 010010010000010 | | |

Fig.6

|  | TYPE INFO 1 | CODE WORD | TYPE INFO 2 | CODE WORD |
|---|---|---|---|---|
| SYNC CODE S1 | 10010 | 114 | 00010 | 86 |
| SYNC CODE S2 | 01001 | 102 | 01000 | 96 |
| SYNC CODE S3 | 10001 | 111 | 10000 | 105 |
| SYNC CODE S4 | 00000 | 77 | 00001 | 83 |

Fig. 17

|  | TYPE INFO 1 | CODE WORD | TYPE INFO 2 | CODE WORD |
|---|---|---|---|---|
| SYNC CODE S0 | 0 0 0 0 0 0 | 119 | 0 0 0 1 0 0 | 138 |
| SYNC CODE S1 | 1 0 0 0 0 0 | 125 | 1 0 0 1 0 0 | 144 |
| SYNC CODE S2 | 0 1 0 0 0 0 | 128 | 0 1 0 0 1 0 | 155 |
| SYNC CODE S3 | 0 0 1 0 0 0 | 132 | 0 0 1 0 0 1 | 171 |
| SYNC CODE S4 | 0 0 0 0 1 0 | 146 | 1 0 0 0 1 0 | 152 |
| SYNC CODE S5 | 0 0 0 0 0 1 | 158 | 1 0 0 0 0 1 | 164 |

RECORDING MEDIUM, RECORDING METHOD AND APPARATUS, AND REPRODUCTION METHOD AND APPARATUS

This application is a continuation, of application Ser. No. 08,627,605, filed Apr. 02, 1996, now abandoned.

TECHNICAL FIELD

The present invention relates to a recording medium for recording data to which a synchronization code containing various control information is inserted, and to a recording method and apparatus, and a reproducing method and apparatus therefor.

BACKGROUND ART

Data recorded to a magnetic disk, optical disk, or other such recording medium is conventionally recorded with parity bits or other redundant bits added to enable correction of reading errors occurring in the data during reproduction. While this enables error correction processing to be applied to the reproduced data, demand has grown in recent years for more robust error correction capabilities. One method of improving the error correction capability is to increase the number of redundant bits added to the data. Increasing the number of redundant bits is not particularly desirable, however, because of the reduced recording density this implies. One method of improving the error correction capability without also increasing the size of the error correction code is to increase the size of the data unit to which error correction processing is applied. For example, one data block may comprise plural sectors, and the data block is used as the error correction processing unit.

FIG. 18 is used to describe the data format of the data block conventionally used as the processing unit for error correction processing.

Each data block comprises 32 sectors, an attribute line, and a parity block. Each sector comprises four lines; to each sector line are written 129 code words identified as D(i,0)–D(i,128), each code word equivalent to one byte of data, and sixteen parity code words P(i,0)–P(i,15) corresponding to the data bytes. Note that "i" represents the line number in the data block. Lines 0–3 are assigned to sector 1, lines 4–7 to sector 2, . . . and lines 124–127 to sector 32. Each sector thus has a 516 byte capacity, including 512 bytes of user data and 4 bytes of CRC code data.

Line 128 is the attribute line to which the block attributes and the attributes of each sector in the block are recorded by data bytes D(128,0)–D(128,128). Parity words P(128,0)–P(128,15) for data bytes D(128,0)–D(128,128) are also recorded to line 128.

As a result, 129 code words of data D(0,j)–D(128,j) (where $0 \leq j \leq 128$), and 129 code words of parity data P(0,k)–P(128,k) (where $0 \leq k \leq 15$), are thus written columnwise to the data block.

Sixteen code words of parity data Q(0,j)–Q(15,j) for the columnwise data words D(0,j)–D(128,J), and 16 code words of parity data Q(0,m)–Q(15,m) (where $129 \leq m \leq 144$) for the columnwise parity words P(0,k)–P(128,k), are written to the parity block.

An address is assigned to each data block containing the code words and parity words arrayed as described above, and is written to a particular location on the recording medium.

However, because the address is only written to the beginning of the data blocks thus formatted, and an address is not added to each sector, access and search times both increase as the block size increases.

More specifically, if data reading starts from some midpoint in a block, it is not possible to determine where in what block data reading started. It is therefore necessary to always start reading from the beginning of the data block, making it necessary to wait until the address at the beginning of the block is recognized when accessing any particular block.

Because the address can only be determined when reading starts at the beginning of a block, the average time required for an address to be read increases as the block size increases. This makes searches take longer.

While it is possible to add a frame number to each frame as a means of reducing access time, the code word must be lengthened to express all frame numbers, and the recording density of the recording medium drops because these code words must also be added to each frame. In addition, these frame numbers cannot be used for any other function.

DISCLOSURE OF INVENTION

Therefore, the primary object of the present invention is to provide a recording medium to which information is recorded using a multifunctional synchronization code that enables a data structure achieving a high error correction capability without reducing the recording density.

A further object of the invention is to provide new methods for recording and reproducing the information recorded with said synchronization code.

To achieve the aforementioned objects, an article of manufacture according to the present invention comprises: a reproducer usable recording medium having a reproducer readable code embodied therein, said reproducer readable code in said article of manufacture comprising: synchronization codes provided along a track with an interval between two synchronization codes; and data codes filled in said interval between two synchronization codes, said data codes comprising a sequence of code words; said synchronization code comprising an identifier having a particular pattern distinguishable from any data in said data codes, and a type information code representing a type of synchronization code.

According to the present invention, a recording method for recording a sequence of code words to a recording medium, in which a plurality of code words form a frame, and a plurality of frames form a data block, said method comprises the steps of:

(a) inserting synchronization codes at a beginning of and at preselected places in said data block;

(b) adding an identifier code to each said synchronization code for discriminating the synchronization code from other codes in the data block;

(c) adding a type information code to each said synchronization code for indicating a type of synchronization code based on the position in the block where the synchronization code is insertion; and (d) outputting for recording the data blocks to which the synchronization codes have been inserted.

According to the present invention, a recording apparatus for recording a sequence of code words to a recording medium, in which a plurality of code words form a frame, and a plurality of frames form a data block, said apparatus comprises: inserting means for inserting synchronization codes at a beginning of and at preselected places in said data block; first adding means for adding an identifier code to each said synchronization code for discriminating the synchronization code from other codes in the data block; second adding means for adding a type information code to each said synchronization code for indicating a type of synchronization code based on the position in the block where the synchronization code is insertion; and outputting means for outputting the data blocks to which the synchronization codes have been inserted for recording to said recording medium.

According to the present invention, a reproduction method for reproducing information from a recording medium storing synchronization codes provided along a track with an interval between two synchronization codes, and data codes filled in said interval between two synchronization codes, said data codes comprising a sequence of code words; said synchronization code comprising an identifier having a particular pattern distinguishable from any data in said data codes, and a type information code specifying a location of the corresponding synchronization code in a data block, said method comprises the steps of:

(a) detecting said synchronization code by detecting said identifier; and (b) reading said type information code in said synchronization code to specify the location of said synchronization code and eventually specifying the data codes following said synchronization code in the data block.

According to the present invention, a reproduction apparatus for reproducing information from a recording medium storing synchronization codes provided along a track with an interval between two synchronization codes, and data codes filled in said interval between two synchronization codes, said data codes comprising a sequence of code words; said synchronization code comprising an identifier having a particular pattern distinguishable from any data in said data codes, and a type information code specifying a location of the corresponding synchronization code in a data block, said apparatus comprises: detecting means for detecting said synchronization code by detecting said identifier; and reading means for reading said type information code in said synchronization code to specify the location of said synchronization code and eventually specifying the data codes following said synchronization code in the data block.

The recording medium according to the present invention records information using a synchronization code comprising an identifier code used to discriminate the synchronization code from the other information, and a type information code immediately following the identifier code and identifying the type of synchronization code.

It is therefore possible by the present invention to provide a recording medium to which is recorded a code word sequence containing a particular synchronization code whereby the synchronization codes contained in the data written to the recording medium can be identified and frame synchronization can be achieved by detecting the identifier codes identifying the synchronization codes, and information of which the type is expressed by the synchronization code and which expresses something other than the synchronization code can be obtained by reading the type information code following the identifier code.

The recording medium according to a first aspect of the present invention records a type information code identifying specifically the address of the synchronization code in a data block comprising a particular number of frames.

It is therefore possible by this aspect to provide recording medium to which is recorded a code word sequence containing a particular synchronization code whereby the location of the synchronization code in the data block can be known by reading the type information code.

The recording medium according to a second aspect of the present invention records an identifier code specifically containing a particular pattern that does not exist in the code word sequence, and forms a code word contained in the code word group with the code segment starting from a particular position in this identifier code and the type information code following thereafter.

It is therefore possible by this aspect to provide a recording medium to which is recorded a code word sequence containing a particular synchronization code whereby the synchronization code can be discriminated from the code word sequence of non-synchronization codes by means of the particular pattern of the identifier code, the code word formed containing the type information code can be read as one code word of the code word group, and the location of the synchronization code in the data block expressed by that type information code can be known, without requiring a special data structure for reading the type information code, if the information expressed by the type information code, and the information expressed by the code word formed containing said type information code, are recorded with a particular correspondence therebetween.

The recording medium according to a third aspect of the present invention selects the type information code from plural type information codes expressing the same type information and resulting in the smallest bias in the dc component of the other information within a specific period of the synchronization code.

It is therefore possible by this aspect to provide a recording medium to which is recorded a code word sequence containing a particular synchronization code whereby the location of the synchronization code in the data block can be known by reading the type information code, and which is selected to achieve the least bias in the dc component of the reproduction signal reproduced from the recording medium of the invention.

With the recording medium according to a fourth aspect of the invention, the data blocks are specifically divided into plural sectors of plural frames each, information expressing the sector address is contained in a particular frame in each sector, and a type information code identifying the frame containing the sector address information is contained in the synchronization code inserted before the frame containing the sector address information.

It is therefore possible by this aspect to provide a recording medium to which is recorded a code word sequence containing a particular synchronization code whereby the frame containing the sector address information can be easily determined by reading the type information code of the synchronization code. It is therefore possible to access a particular block at high speed by simply reading only the type information code of the synchronization code and the address information, and code word sequences containing the synchronization code can be read from some midpoint in the desired block.

In the recording method according to a fifth aspect of the invention, the block start identification step identifies the beginning of a data block comprising plural frames. The synchronization code insertion position identification step identifies the position in said data block to which the synchronization code should be inserted. The identifier code insertion step then inserts an identifier code for discriminating the synchronization code from the other information at the identified synchronization code insertion position. The type determination step determines the type of synchronization code based on the identified synchronization code insertion position. The type information code insertion step inserts immediately after the identifier code the type information code expressing the determined synchronization code type. The recording step then records to a continuous area of the recording medium the data blocks to which the identifier code and type information code have been thus inserted.

It is therefore possible by this aspect to provide a recording method for recording to a recording medium a code sequence containing a synchronization code whereby the identifier code identifies the synchronization code from the code word sequences containing non-synchronization code information, and the type information code indicating the synchronization code type is selected according to the synchronization code insertion position and can also be used to express information other than identifying the synchronization codes.

The recording method according to the sixth aspect of the invention further comprises an identifier code generating step generating, after identifying the synchronization code insertion position, an identifier code containing a particular pattern that does not exist in the code word sequence expressing information other than the synchronization codes; and a type information code generating step generating, after determining the synchronization code type, a type information code whereby one of the code words included in said code word group is formed by the code segment starting from a particular position in the generated identifier code and the type information code expressing the determined synchronization code type. The recording step in this method records the generated type information code.

It is therefore possible by this aspect to provide a recording method for writing to a recording medium a code word sequence containing a particular synchronization code whereby the synchronization code can be discriminated from the code word sequence of non-synchronization codes by means of the particular pattern of the identifier code, the code word formed containing the type information code can be read as one code word of the code word group, and the location of the synchronization code in the data block expressed by that type information code can be known, without requiring a special data structure for reading the type information code, if the information expressed by the type information code, and the information expressed by the code word formed containing said type information code, are recorded with a particular correspondence therebetween.

The recording method according to the seventh aspect of the invention, further comprises a dc component calculation step calculating, after identifying the synchronization code insertion position, the amount of dc component bias in the non-synchronization code information within a known period of the position to which the synchronization code is inserted; and a type information code selection step selecting from among plural type information codes expressing the same type as the determined synchronization code type, the type information code resulting in the least dc component bias. The type information code recording step records the selected type information code.

It is therefore possible by this aspect to provide a recording method for writing to a recording medium a code word sequence containing a particular synchronization code whereby the location of the synchronization code in the data block can be known by reading the type information code, and which is selected to achieve the least bias in the dc component of the reproduction signal reproduced from the recording medium of the invention.

The recording method according to the eighth aspect of the invention further comprises an address frame identification step identifying within each data block divided into plural sectors of plural frames each, the frame that contains the sector address information and is located at a particular position in each sector. The type information code insertion step in this method inserts a type information code to the synchronization code before the frame containing the address information and identifying the frame containing the address information immediately following the identifier code.

It is therefore possible by this aspect to provide a recording method for writing to a recording medium a code word sequence containing a particular synchronization code whereby the frame containing the sector address information can be easily determined by reading the type information code of the synchronization code. It is therefore possible to access a particular block at high speed by simply reading only the type information code of the synchronization code and the address information, and code word sequences containing the synchronization code can be read from some midpoint in the desired block.

In the reproduction method according to the ninth aspect of the invention, the synchronization code identification step identifies the synchronization code in the information recorded to the recording medium according to the first aspect by detecting the identifier code. The code word synchronization step then synchronizes the read clock to a code word based on the identified synchronization code. A type information read step then reads the type information code of the synchronization code based on the read clock synchronized to the code word. A data location determination step then determines the location in the data block of the information recorded immediately following the synchronization code based on the read type information code.

It is therefore possible by means of a reproduction method according to the ninth aspect to accurately discriminate the synchronization codes, and synchronize the read clock to the code words, based on a code word sequence containing a particular synchronization code written to a recording medium according to the first aspect. It is also possible to selectively read information recorded immediately following the synchronization code by thus determining the location of information recorded immediately following the synchronization code in the data block.

In the reproduction method according to the tenth aspect of the invention, the synchronization code identification step identifies the synchronization codes in the information recorded to the recording medium according to the second aspect by detecting an identifier code containing a particular pattern that does not exist in the code word sequences expressing non-synchronization code information. The code word synchronization step synchronizes the read clock to the code word based on the identified synchronization code. The type information read step then reads the type information code as a code word based on the read clock synchronized to the code word. The type decoding step then decodes the read type information code as code words to extract the type information; and the data location determination step determines the location in the data block of the information recorded immediately following the synchronization code based on the extracted type information.

It is therefore possible by means of a reproduction method according to the tenth aspect to accurately discriminate the synchronization codes, and synchronize the read clock to the code words, based on the particular pattern of the identifier code. It is also possible to selectively read information recorded immediately following the synchronization code by reading the code word formed containing the type information code as one code word of the code word group, and determining the location of information recorded immediately following the synchronization code in the data block.

In the reproduction method according to the eleventh aspect of the invention, the synchronization code identification step identifies the synchronization code in the recorded information by detecting an identifier code in the data recorded to a recording medium according to the fourth aspect. The code word synchronization step synchronizes the read clock to the code word based on the identified synchronization code. The type information read step then reads the type information code of the synchronization code based on the read clock synchronized to the code word. The data location determination step determines the location in the data block of the information recorded immediately following the synchronization code based on the read type information code. The address recognition step then recognizes the information at a particular location in the frame determined by the data location determination step to be the frame containing the address information as the address information.

It is therefore possible by means of the reproduction method according to the eleventh aspect to easily determine from the data recorded to a recording medium according to the fourth aspect the frames containing address information based on the type information codes of the synchronization codes. It is therefore possible to access a particular block at high speed by simply reading only the type information code of the synchronization code and the address information, and code word sequences containing the synchronization code can be read from some midpoint in the desired block.

The present application is based upon Japanese Patent Application Serial No. 7-78,988, which was filed on Apr. 4, 1995, the entire content of which is expressly incorporated by reference herein.

BRIEF DESCRIPTION OF DRAWINGS

The present invention will become more fully understood from the detailed description given below and the accompanying diagrams wherein:

FIG. 2 is a conversion table showing examples of 8–15 conversion used in the preferred embodiments of the invention;

FIG. 3 is a conversion table showing examples of 8–15 conversion used in the preferred embodiments of the invention;

FIG. 6 is a table showing the type information of the synchronization code according of the preferred embodiment, and the values of the corresponding code words;

FIG. 17 is a table similar to that shown in FIG. 6, but for the synchronization codes according of an alternative embodiment of the invention;

DETAILED DESCRIPTION OF THE PREFERRED EMBODIMENTS

Embodiment 1

Figure 1:
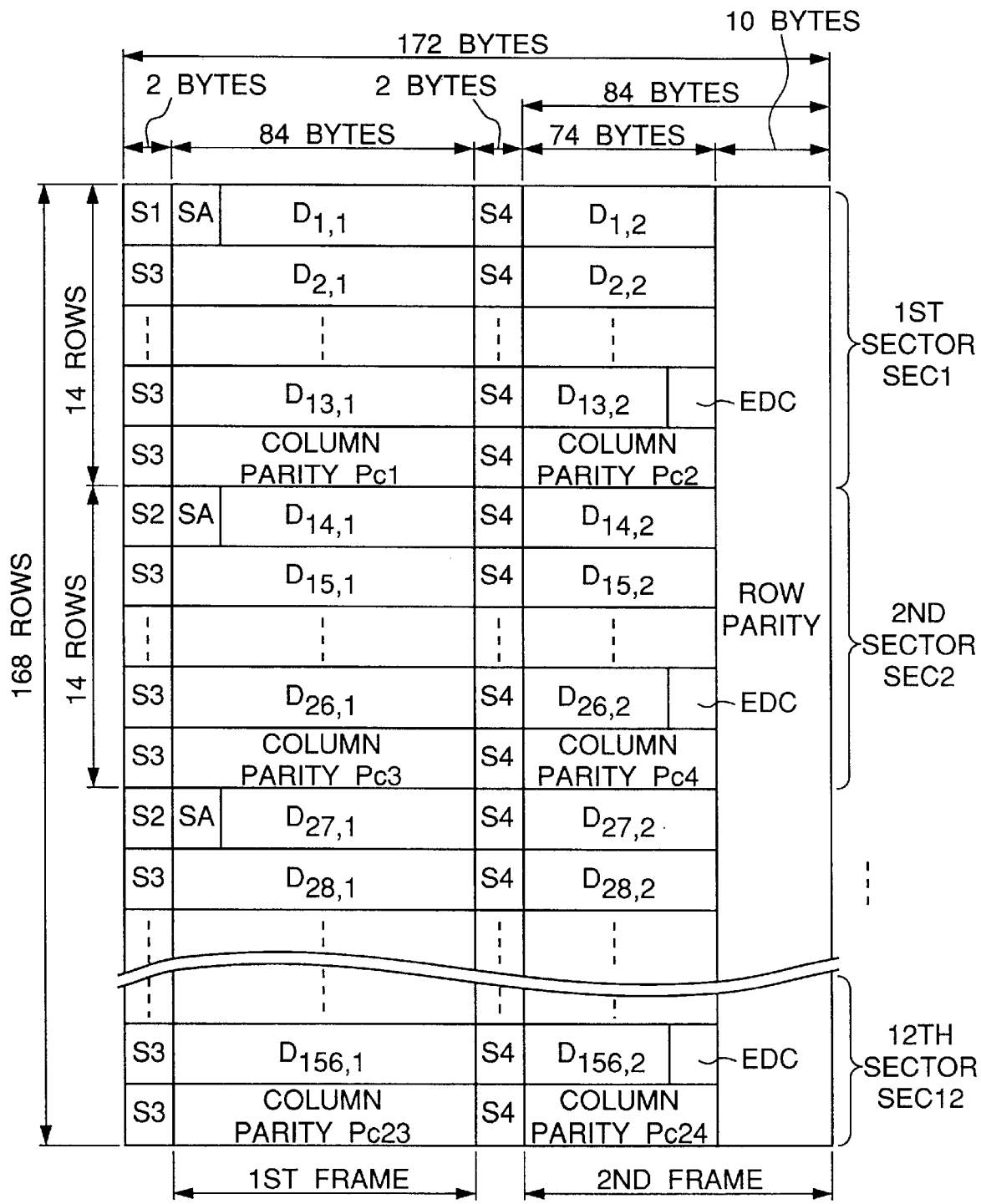
FIG. 1 is a diagram showing the data and synchronization code as the data to be written to a recording medium according to the first embodiment of the invention before modulation for recording.

FIG. 1 is a data table showing the data and synchronization code to be written to a recording medium according to the first embodiment of the invention; the data and synchronization code are shown before data modulation.

Data is written to the optical disk in data blocks (the error correction processing unit) of 168×168 bytes not including the synchronization code. FIG. 1 is a conceptual data table showing the data in one data block in a hypothetical two-dimensional array.

Each row in this 2D data block array is identically formatted. More specifically, each row in the block comprises a synchronization code (2 bytes), data frame 1 (84 bytes), another synchronization code (2 bytes), and data frame 2 (84 bytes). Each row starts with synchronization code S1, S2, or S3 written before data frame 1, to which data D1,1, D2,1, . . . D156,1 is written. Synchronization code S4 is then written before data frame 2, to which data D1,2, D2,2, . . . D156,2 is written. A 10-byte parity code Pr corresponding to the data in the two frames written to the same row is written to the last ten bytes of the data written to data frame 2.

Each block comprises twelve sectors SEC1–SEC12 each comprising fourteen rows as shown in FIG. 1 in this example. The sector address is written at the beginning of each sector to the data area of the data frame following synchronization code S1 or S2.

Synchronization code S1 is written immediately before data frame 1 in sector SEC1 at the beginning of the block, and thus identifies the beginning of a data block. Synchronization code S2 is written immediately before data frame 1 at the beginning of the first row in each sector other than sector SEC1 at the beginning of the first block, and identifies the start of a data sector. Synchronization code S3 is written immediately before data frame 1 in rows 2–14 of every sector, and identifies the start of each new row other than the first row in the block or sector. Synchronization code S4 is written immediately before data frame 2 in every row, and identifies the approximate middle of each row.

The fourteenth row of each sector is the column parity row Pc. A 12-byte parity code is written for each 156 data bytes collected columnwise from rows 1–13 in each sector (corresponding to 12 bytes per row (12×13=156)), and the seven 12-byte parity codes are written byte by byte to the parity row Pc1–Pc24 (row 14) in the corresponding column. The parity rows written to row 14 of each sector are used for error correction processing after all data in one block is read.

The data blocks thus formatted are converted to code words by 8–15 conversion as described below, and then modulated with NRZI modulation to generate a channel signal for writing to an optical disk or other recording medium. Note that the synchronization codes S1–S4 are converted to code sequences of which the identifier is expressed by a pattern that will not appear in the data frame (i.e., the data being recorded) according to the coding rules used for 8–15 conversion.

FIGS. 2 and 3 are conversion tables showing an example of the 8–15 conversion used in this embodiment of the invention.

As shown in FIGS. 2 and 3, the 8–15 conversion method of this embodiment assigns at least one code word expressed by a 15-bit pattern for each 8 data bits (1 byte). In the table of FIGS. 2 and 3, the MSB of the 15-bit pattern serves as a merging bit for connecting the code words. All the merging bits are shown as 0, but can be changed to 1 in accordance with a DC control. The detail of the DC control is disclosed in U.S. Pat. No. 4,728,929 to S. Tanaka issued Mar. 1, 1988, which is herein incorporated by reference.

The code words converted by this 8–15 conversion method are generated so that a maximum of thirteen (or twelve) and a minimum of two zeroes [0] occur consecutively between 1s in any consecutive code word sequence. Thus, when the code word sequence is expressed by the inversion periods of the NRZI channel signals corresponding to the code words, the maximum inversion period $T_{max}$ is 14T (or 13T) and the minimum inversion period $T_{min}$ is 3T where T is the length of one code word bit. Note that the code words are controlled so that the maximum and minimum numbers of consecutive 0s between 1s satisfy these $T_{max}$ and $T_{min}$ parameters even in the junctions between code words.

Figure 4:
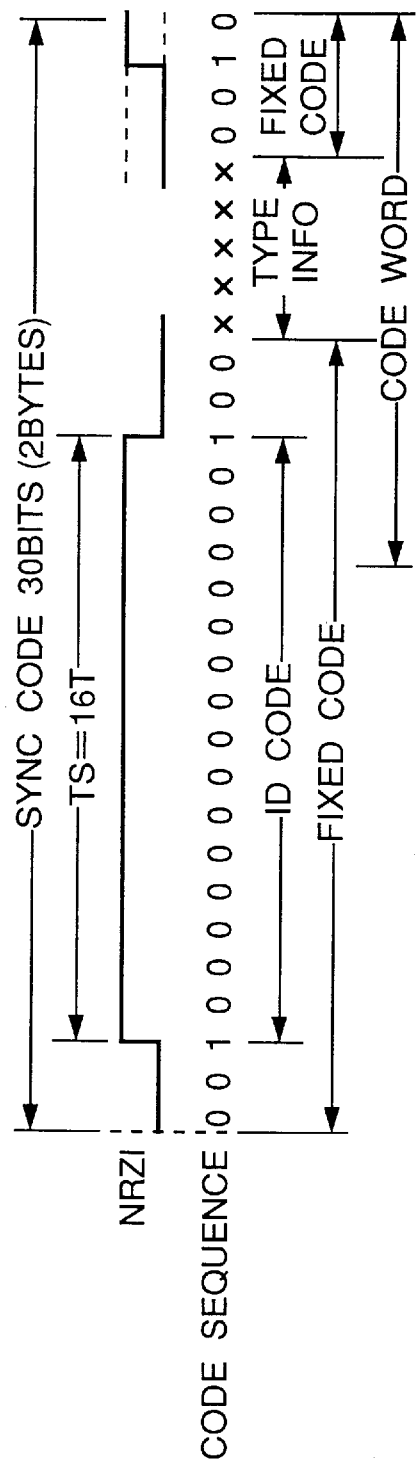
FIG. 4 is a diagram showing the data structure of the synchronization codes S1–S4 in the preferred embodiments of the invention.

FIG. 4 is used to describe the data structure of the synchronization codes S1–S4 in this embodiment of the invention. Note that in FIG. 4 "x" represents bits with a code value of either zero (0) or one (1).

The synchronization codes S1–S4 have a data length of two bytes, expressed by a 30-bit code sequence. Each synchronization code comprises an identifier for discriminating the synchronization code from other data, and type information identifying the location in the data block to which the synchronization code is inserted.

The identifier is a code sequence of fifteen zeroes (0) preceded and followed by a one (1) on each end, i.e., is expressed in the NRZI-modulated channel signal as inversion interval $TS=T_{max}+2T$ (or $T_{max}+3T$)=16T. Note that this code sequence and inversion interval only appear in the synchronization code, i.e., do not appear in the code words expressing data other than the synchronization codes (i.e., "non-synchronization code data") or in the corresponding NRZI channel signal.

The type information is expressed by the five bits from bit 22 to bit 26 of the synchronization code. Note, further, that only the type information may vary in the synchronization code, and all other parts of the synchronization code are fixed code sequences common to every synchronization code. The fixed code sequences are also defined to satisfy the 8–15 conversion coding rules where the synchronization code and the non-synchronization code data meet.

The 15-bit code sequence occupying the second half of the synchronization code is a code sequence selected that also exists as a code word generated by 8–15 conversion. This 15-bit code sequence is one code word, the smallest data unit of the 8–15 conversion method, and the smallest data read unit of the 8–15 conversion is therefore also defined as 15 bits. As a result, the 5-bit type information cannot be read alone as meaningful data unless a new data format for reading 5-bit code sequences is defined. Therefore, by defining the last 15-bit code sequence in the synchronization code as one code word, the code word containing the type information can be read in the same manner as the other data during 8–15 reverse conversion of the signal reproduced from the recording medium.

Instead of the 8–15 conversion, it is possible to use a 8–16 conversion.

The selection of the bit lengths $T_{max}$ and $T_{min}$ will be further explained below.

Figure 7:
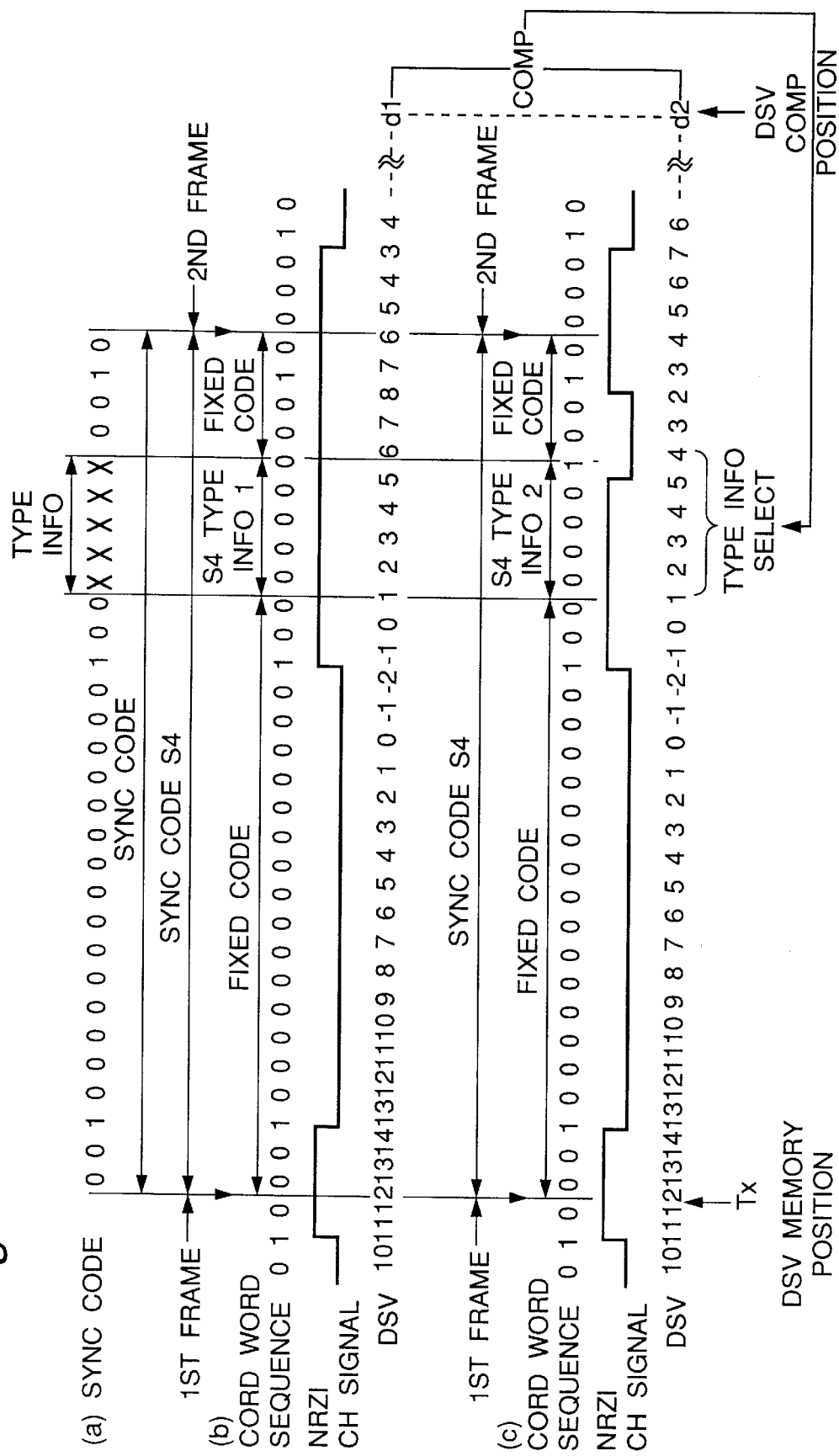
FIG. 7 are diagrams (a)–(f) showing the method of selecting type information code 1 or type information code 2 in the synchronization code in the preferred embodiments of the invention.

When the NRZI channel signal, such as shown in FIG. 7 (c) is recorded on an optical disk or other recording medium, a pit or a marking is formed along a disk track correspondingly to a HIGH level portion of the NRZI channel signal, and no pit or no marking is formed correspondingly to a LOW level portion. Since the pits or the markings are formed, for example, by the laser beam, it is necessary to limit the length of such pits or such markings and the interval length therebetween as explained next. If the length of the marking or the marking interval is relatively long, the stability of the PLL control necessary for producing the read clock will be decreased, resulting in wider variation of the reproduced signal level after a high pass filter. Also, if the laser beam is radiated for a relatively short term, no pit or no marking will be formed on the disk, or the pit or marking will be too small to read.

For these and other reasons, according to the present invention, a pit or a marking for the data (such as video and/or audio data) has the maximum pit length or the maximum marking length $T_{max}$ of 14T (or 13T), a special pit or a special marking for an identifier in the synchronization code has the pit length TS which is equal to $T_{max}+nT$ in which n is an integer equal to or greater than 2 and T is a unit length representing one binary code. According to one embodiment, n=2, and according to a preferred embodiment, n=3. By selecting the pit or marking length of the identifier longer than any pit or marking in the data, it is possible to discriminate the identifier from the data.

Also according to the present invention the minimum pit length or the minimum marking length $T_{min}$ for a pit or a marking for data and for synchronization code is determined as 3T.

Figure 5:
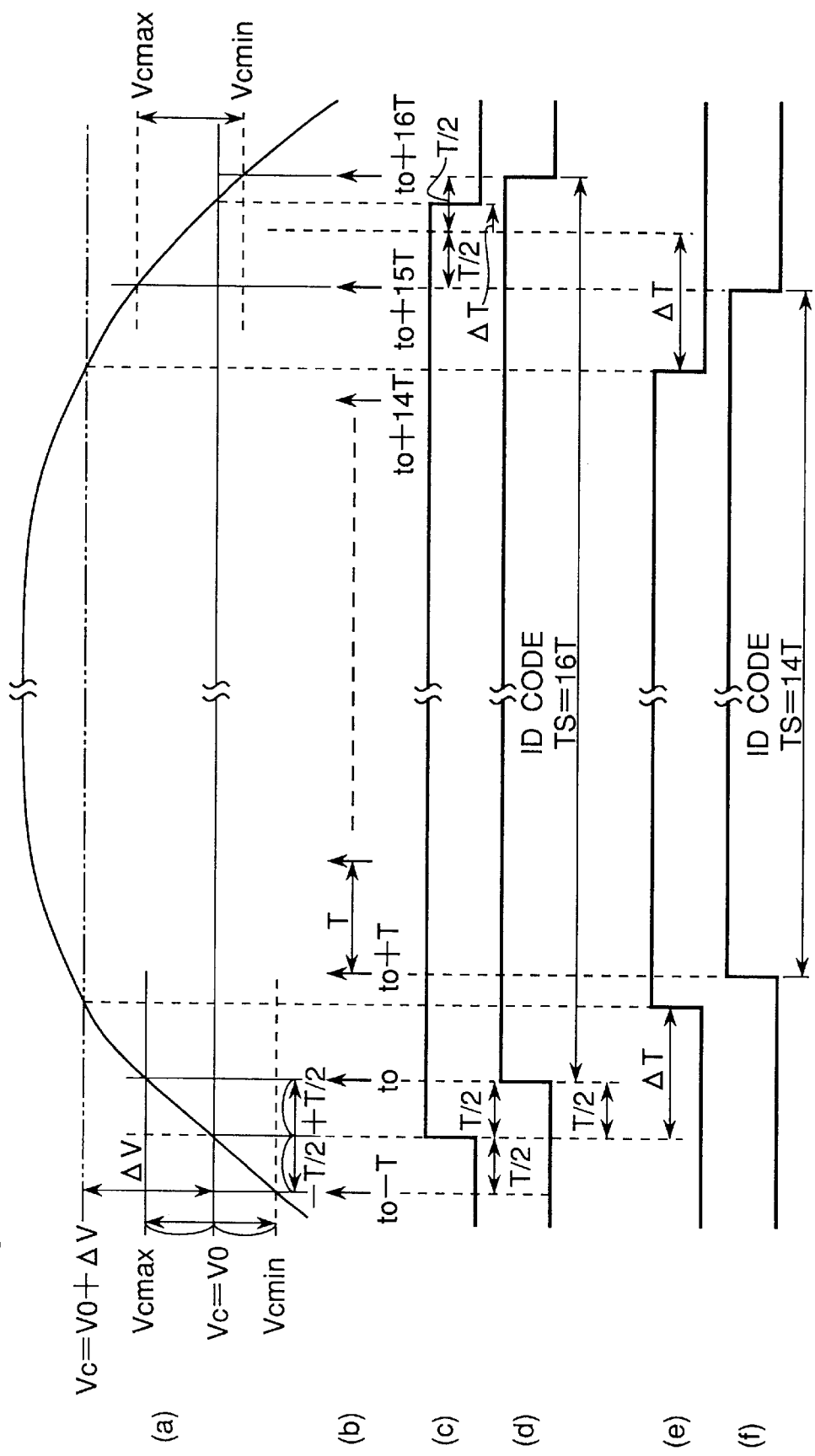
FIG. 5 are diagrams (a)–(f) showing the relationship between the reproduction signal reproduced from an optical disk according to the present embodiment, and the NRZI channel signal read from the reproduction signal.

FIG. 5 is used to describe the relationship between the reproduction signal reproduced from an optical disk according to the present embodiment, and the NRZI channel signal read from the reproduction signal. FIG. 5 (a) shows the reproduction signal reproduced for the synchronization code identifier, and the read threshold value $V_c$ therefor. FIG. 5 (b) shows the read clock supplied at bit interval T. FIG. 5 (c) shows the comparator output signal when the reproduction signal and the read threshold value $V_c=V_0$ are input. FIG. 5 (d) shows the NRZI channel signal obtained by sampling the comparator output signal shown in FIG. 5 (c) at the read clock shown in FIG. 5 (b). FIG. 5 (e) shows the comparator output signal when the reproduction signal and a read threshold value $V_c$ exceeding the tolerance range ($V_c=V_0+\Delta V$) are input. FIG. 5 (f) shows the NRZI channel signal obtained by sampling the comparator output signal shown in FIG. 5 (e) at the read clock shown in FIG. 5 (b). Note that the comparator output signal inverts to a HIGH level at the intersection of the reproduction signal and the read threshold value $V_c$, and the NRZI channel signal in FIG. 5 (d) inverts from a LOW to a HIGH level at time t0.

The reproduction signal reproduced from the recording medium is obtained as an analog signal as shown in FIG. 5 (a). The reproduction signal is therefore converted to a digital signal by means of the comparator converting values equal to or greater than the read threshold value $V_c$ to HIGH bits, and values below the read threshold value $V_c$ to LOW bits. The digitized comparator output signal is then sampled at the read clock timing shown in FIG. 5 (b), generating the NRZI channel signals shown in FIGS. 5 (d) and (f). The read clock phase and read threshold value are controlled so that the comparator output signal inverts at a particular reference position, which is defined here as the median between the current read clock and the next read clock. However, when the read threshold value $V_c$ is not stable, such as at the start of reproduction signal reading, the read threshold value $V_c$ will vary as shown in FIG. 5 (a). This variation in the read threshold value $V_c$ appears as offset $\Delta T$ from the reference position of the timing at which the comparator output signal inverts.

If the NRZI channel signal shown in FIG. 5 (d) is the result of correct signal reading, the tolerance range $V_{cmin}$ to $V_{cmax}$ for variation in the read threshold value $V_c$ (i.e., the range in which NRZI channel signal read errors do not occur) must be in the range $-(T/2)<\Delta T\leq(T/2)$, shown from time (t0--T) to time t0 in FIG. 5 (a), where $\Delta T$ is the offset from the reference position of comparator output signal inversion timing. As shown in FIG. 5 (c), the comparator output signal inversion timing is within the tolerance range $-(T/2)<\Delta T\leq(T/2)$ from time (t0+15T) to time (t0+16T), producing offset $\Delta T$ from the reference position. The correct sampling value can therefore be obtained by the read clock at time (t0+16T).

However, when the offset $\Delta T$ from the inversion timing reference position of the comparator output signal exceeds the tolerance range expressed as $-(T/2)<\Delta T\leq(T/2)$ due to read threshold value $V_c$ fluctuation, the inversion interval is offset (shifted) $\pm T$ at the NRZI channel signal rise and $\pm T$ at the NRZI channel signal drop.

Therefore, when the relative variation in the read threshold value $V_c$ to the reproduction signal temporarily exceeds the read threshold value $V_c$ tolerance range due, for example, to noise, the inversion position of the NRZI channel signal expressing the synchronization code and data shifts one bit ($\pm T$). In other words, the position of the 1 in the code sequence of the corresponding code word sequence shifts 1 bit to the adjacent code bit. There is a high probability that data read errors of this type can be properly corrected by the error correction process of the reproduction apparatus. Conversely stated, if the optical disk reproduction apparatus is not designed with tolerance sufficient to correct 1-bit shifts in the inversion position occurring at a normal frequency due to noise or other factors, the optical disk reproduction apparatus will not be able to withstand everyday use. It can therefore be assumed that the inversion interval of the reproduced NRZI channel signal will virtually never shift 2T or greater due to factors such as noise.

It is possible in this case that the maximum inversion interval $T_{max}=14T$ in the NRZI channel signals for non-synchronization code data may be read as an interval of 13T or 15T, but there is virtually no possibility that it will be read as 12T or 1T. It is also possible that the inversion interval TS=16T of the synchronization code identifier will be read as a 15T or 17T interval. In this case, however, because there is no signal segment that inverts with an inversion interval of 1T or greater in the NRZI channel signals expressing non-synchronization code data, the non-synchronization code data and synchronization code can be correctly identified by determining that any signal segment with an inversion interval of 16T or greater is a synchronization code identifier. The identifier for a synchronization code read with a 15T inversion interval will not be valid at this time, but the invalidated synchronization code is prevented from being read as non-synchronization code data by a separate determination cross-referencing the periodicity of the synchronization code in the NRZI channel signal.

However, if the change in the read threshold value $V_c$ above the tolerance range is sustained at $V_c=V0+\Delta V$ as shown by the double-dot-dash line in FIG. 5 (a), a read error of inversion interval T will occur at the inversion part of the NRZI channel signal at both ends of the synchronization code identifier, and in the data following that synchronization code, as shown in FIG. 5 (f). When this happens, a signal segment with a 16T inversion interval, i.e., a signal segment that should not occur in the non-synchronization code data, occurs in the non-synchronization code data. As a result, by determining any signal segment with an inversion interval of 16T or greater to be the synchronization code identifier, the reproduction apparatus determines an indeterminate part of data that is not the synchronization code data to be the beginning of some frame, thereby disrupting the data read synchronization timing, and preventing any subsequent data from being read. Even if the synchronization is not disrupted, the probability is low that the read errors resulting from the reproduced data will be correctable by the error correction process. As a result, optical disk readers detect a data read problem when plural signal segments with an inversion interval of 18T or greater are detected, and execute an appropriate process.

By thus defining the length of the inversion interval TS of the synchronization code identifier as $TS=T_{max}+2T$ or greater, the synchronization code can be accurately discriminated from the non-synchronization code data within the data read range. Furthermore, by defining the length of the inversion interval TS of the synchronization code identifier as $TS=T_{max}+2T$ or greater, the length of the synchronization code identifier can be shortened compared with an inversion interval TS of $2T_{max}$ as in the synchronization code of the prior art, and this difference can be used to include other type information adding a variety of other functions in the synchronization code. Moreover, because the overall length of the synchronization code can be set to twice the code word length, the first and second halves of the synchronization code can be separated in the same way as reading the code words expressing non-synchronization code data, and the type information written to the code word constituting the second half of the synchronization code can be read in the same way the code words expressing the non-synchronization code data can be read.

FIG. 6 is another data table showing the type information of the synchronization code according of the present embodiment, and the read values of the corresponding code words.

The type information written to the five bits from bit 22 to bit 26 of the synchronization codes S1–S4 formatted as shown in FIG. 4 identify the location in the data block to which the synchronization code is inserted. Synchronization code S1 indicates that said synchronization code S1 is inserted at the beginning of the data block, i.e., at the beginning of sector SEC1, by using type information 1 (10010) or type information 2 (00010). Synchronization code S2 likewise indicates that said synchronization code S2 is inserted at the beginning of any sector other than the first sector in the data block, i.e., to sectors SEC2–SEC14, by using type information 1 (01001) or type information 2 (01000). Synchronization code S3 likewise indicates that the synchronization code is inserted at the beginning of any row other than the first row in any sector by using type information 1 (10001) or type information 2 (10000). Synchronization code S4 indicates that the synchronization code is inserted in the beginning of data frame 2 starting from the middle of any row by using type information 1 (00000) or type information 2 (00001).

As also shown in FIG. 6, the type information is read by reading the normal code word unit containing the type information. For example, the type information 1 (10010) of synchronization code S1 is inserted to the five bits from bit 22 to bit 26 of the synchronization code as shown in FIG. 4. The code pattern of the synchronization code S1 containing this type information 1 code (10010) is therefore (0010000000000000000100100100010), and the code word containing this type information 1 code (10010) in this synchronization code S1 is (000100100100010). As a result, the code word part of the synchronization code S1 containing the type information 1 code 10010 is read as 114 as shown in the 8–15 data conversion table in FIG. 2. The code word part of a synchronization code S1 containing the type information 2 code 00010 is similarly read as a value of 86. If the code word read immediately after recognizing the synchronization code identifier is 114 or 86, the identified synchronization code is known to be the synchronization code S1 inserted to the beginning of the block. Synchronization codes containing other type information are recognized in the same manner.

Note that while type information codes 1 and 2 indicate the same synchronization code insertion position, the number of ones contained in the five type information bits is even in type information code 1, and odd in type information code 2.

FIG. 7 is used to describe the method of selecting type information code 1 or type information code 2 in the synchronization code of this embodiment. Note that the method for selecting the type information codes 1 and 2 for synchronization code S4 is shown in FIG. 7 by way of example only, and the same method is used to select the type information codes 1 and 2 for synchronization codes S1–S3. Note also that synchronization code S4 is inserted between frames 1 and 2 as shown in FIG. 1.

FIG. 7 (a) shows the code pattern common to all synchronization codes. FIG. 7 (b) shows the change in the digital sum variation (DSV) when type information code 1 is selected as the type information for synchronization code S4. FIG. 7 (c) shows the change in the digital sum variation (DSV) when type information code 2 is selected as the type information for synchronization code S4. The DSV is the value per unit time obtained by adding +1 if the NRZI channel signal wave is a HIGH level, and adding −1 if the wave is a LOW level, and expresses the bias in the dc component of the NRZI channel signal. Note also that the DSV is a value added cumulatively from a particular position in the data to be recorded, e.g., from the beginning of the data to be recorded, or from the beginning of the block.

As shown in FIG. 1, synchronization code S4 is inserted between data frames 1 and 2 in each row. To determine which type information 1 or 2 is appropriate to synchronization code S4, the DSV value is added cumulatively from the beginning of the data to be recorded to the end of the first frame, i.e., the position immediately before the insertion point of synchronization code S4. A DSV memory stores at time point Tx (FIG. 7) the level of the NRZI channel signal and the DSV value, and in the case shown in FIG. 7, the DSV memory stores HIGH level and d=12. The DSV value d1 at a particular DSV comparison point in frame 2 is then calculated using as the type information inserted to the synchronization code S4 type information 1 (00000). Type information 2 (00001) is then substituted for type information 1, and the DSV value d2 at said DSV comparison point in frame 2 is calculated. The calculated DSV values d1 and d2 are then compared, and the type information yielding the lowest absolute value of the DSV at the DSV comparison point in frame 2 is selected and inserted to the synchronization code S4.

The DSV values up to the fifth bit at the beginning of frame 2 are 4 using type information 1 as shown in FIG. 7 (b), and 6 using type information 2 as shown in FIG. 7 (c). The DSV values continue to be calculated to the particular DSV comparison position in frame 2, however, and the absolute values of the DSV values are compared at the DSV comparison point to select the type information whereby said absolute value is smallest. As a result, bias in the dc component can be suppressed when data is written to the recording medium using the format shown in FIG. 1. Moreover, when compared with the common method of suppressing bias in the dc component by inserting to the data a separate code sequence for suppressing dc component bias, dc component bias can be suppressed using the type information expressing the synchronization code type. The length of the code sequence inserted for dc component bias suppression can therefore be shortened, and the data storage area of the recording medium can be more effectively utilized.

As described above, the reproduction apparatus according to the present invention can easily identify the beginning of the data block by reading synchronization code S1, and can achieve a robust error correction processing capability using the data written to one data block as the error correction processing unit.

The location of frame 1, to which each sector address in that block is written, can also be easily identified by reading synchronization code S2. It is therefore possible to read the data from a specific block in a short time even when a specific block is accessed and reading starts from some midpoint in that block by reading the sector address following the synchronization code S2 at the beginning of the next immediate sector, temporarily buffering the data from that sector to the last sector in the targeted block to memory, then reading the data from the beginning of the targeted block to the initially accessed sector (i.e., the remaining sectors in that block), and inserting this data before the data buffered to memory.

Furthermore, because the location of the frame to which the sector address is written can be easily identified, the desired tracks can be accessed while reading only the addresses, and high speed searching can be achieved.

It is also possible with synchronization codes S1–S4 to recognize the first code word bit in each frame, and correct bit shifting in the reproduced data resulting from bit loss caused by signal dropout during data reproduction, for example.

A signal segment in which the inversion interval TS of the NRZI channel signal corresponding to the synchronization code identifier is TS=($T_{max}$+2T) has been used by way of example in the above embodiment, but a signal segment in which said inversion interval TS=($T_{max}$+3T) may be alternatively used. Even if the read threshold value $V_c$ temporarily varies outside the tolerance range, and the inversion interval shifts ±T in part of the read NRZI channel signals, the maximum inversion interval $T_{max}$, of the NRZI channel signal expressing the non-synchronization code data will be $$T_{max}-T \leq T_{max}, \leq T_{max}+T,$$

and the inversion interval TS' of the NRZI channel signal read as the synchronization code identifier will be $$T_{max}+2T \leq TS' \leq T_{max}+4T.$$

The inversion interval TS of the NRZI channel signal corresponding to the synchronization code identifier can be considered as the pit or marking length formed on a disk, or as an interval length of such pits or markings. According to the present invention, the pit length TS of the identifier is ($T_{max}$+2T) or greater, but is best when it is ($T_{max}$+3T), as explained below.

During reading or writing (herein after only the reading case is explained, but also applied to the writing case) a pit or a marking (herein after generally referred to as a marking, but understood as including both pit and marking and any other type of markings such as a projection) on the disk, it is known that the marking length $T_{max}$ may be erroneously read as ($T_{max}$±T).

When the marking length TS of the identifier is ($T_{max}$+2T), this can be erroneously read as ($T_{max}$+2T)±T which is equal to ($T_{max}$+T) or ($T_{max}$+3T) And, under the same condition, the maximum data marking length $T_{max}$ can be erroneously read as ($T_{max}$±T) which is equal to ($T_{max}$-T) or ($T_{max}$+T). In this case, by accepting the markings with a marking length not only ($T_{max}$+2T), but also ($T_{max}$+3T) as the identifier, it is possible to discriminate between the identifier markings and the maximum markings in the data with a higher reliability than by accepting only the marking with a marking length ($T_{max}$+2T) as the identifier. In this case, the identifier that has been erroneously read as ($T_{max}$+T) is disregarded, because this can not be distinguished with the maximum marking in the data that has been erroneously read as ($T_{max}$+T)

When the marking length TS of the identifier is ($T_{max}$+3T), this can be erroneously read as ($T_{max}$+3T)±T which is equal to ($T_{max}$+2T) or ($T_{max}$+4T) And, under the same condition, the maximum data marking length $T_{max}$ can be erroneously read as $T_{max}$±T which is equal to ($T_{max}$-T) or ($T_{max}$+T). In this case, the markings with a marking lengths ($T_{max}$+2T), ($T_{max}$+3T) and ($T_{max}$+4T) can be used as the identifier, and yet it is possible to distinguish between the identifier markings and the maximum markings in the data. Thus, the discrimination between the identifier markings and the maximum markings in the data can be made with a higher accuracy when the marking length TS of the identifier is made ($T_{max}$+3T) rather than ($T_{max}$+2T).

By determining the signal segment where the inversion interval of the read NRZI channel signal is ($T_{max}$+2T) or greater to be the synchronization code identifier, the synchronization code can be correctly distinguished from the non-synchronization code data, the number of invalid synchronization codes can be decreased, virtually all of the synchronization codes can be correctly identified, and the start of the frame can be identified. It is therefore possible to more precisely correct any data bit shifting resulting from code bit loss caused by, for example, signal dropout during reproduction. When the read threshold value $V_c$ continues to range outside the tolerance range, it is also possible to detect abnormal signal reading, i.e., a read problem, by detecting signal segments in which the NRZI channel signal inversion interval is ($T_{max}$+5T) or greater.

It is to be noted that the five bit type information described above shall not be limited to the correspondence between bit patterns and type information content as described above. More specifically, type information 1 and type information 2 are bit pattern pairs in which one bit pattern contains an odd number of ones (1) and the other pattern contains an even number of ones (1) in a pattern of five bits, and any patterns can be used insofar as the code word part of the synchronization code containing the type information is a pattern that is also found in the code word patterns. The type information may also be placed at the front of the identifier.

It should also be noted that the type information selection method described above calculates the DSV values from the beginning of the data to be recorded to a particular position in the frame immediately following the synchronization code to which the type information is inserted, and selects the type information whereby the absolute value of the DSV is smallest. The DSV calculation range that is the reference for selecting the type information is not, however, thus limited.

Specifically, it is also possible to cumulatively add the DSV values from the beginning of the block (or from the beginning of the frame immediately before the synchronization code, or from a particular position in the frame immediately before the synchronization code) to immediately before the synchronization code; calculate the DSV value to a particular position in the frame following the synchronization code using the synchronization code containing type information 1 and then recalculating the DSV value using the synchronization code containing type information 2; and then select the type information whereby the absolute value of the DSV value calculated to a particular position in the frame following the synchronization code is smallest.

Figure 18:
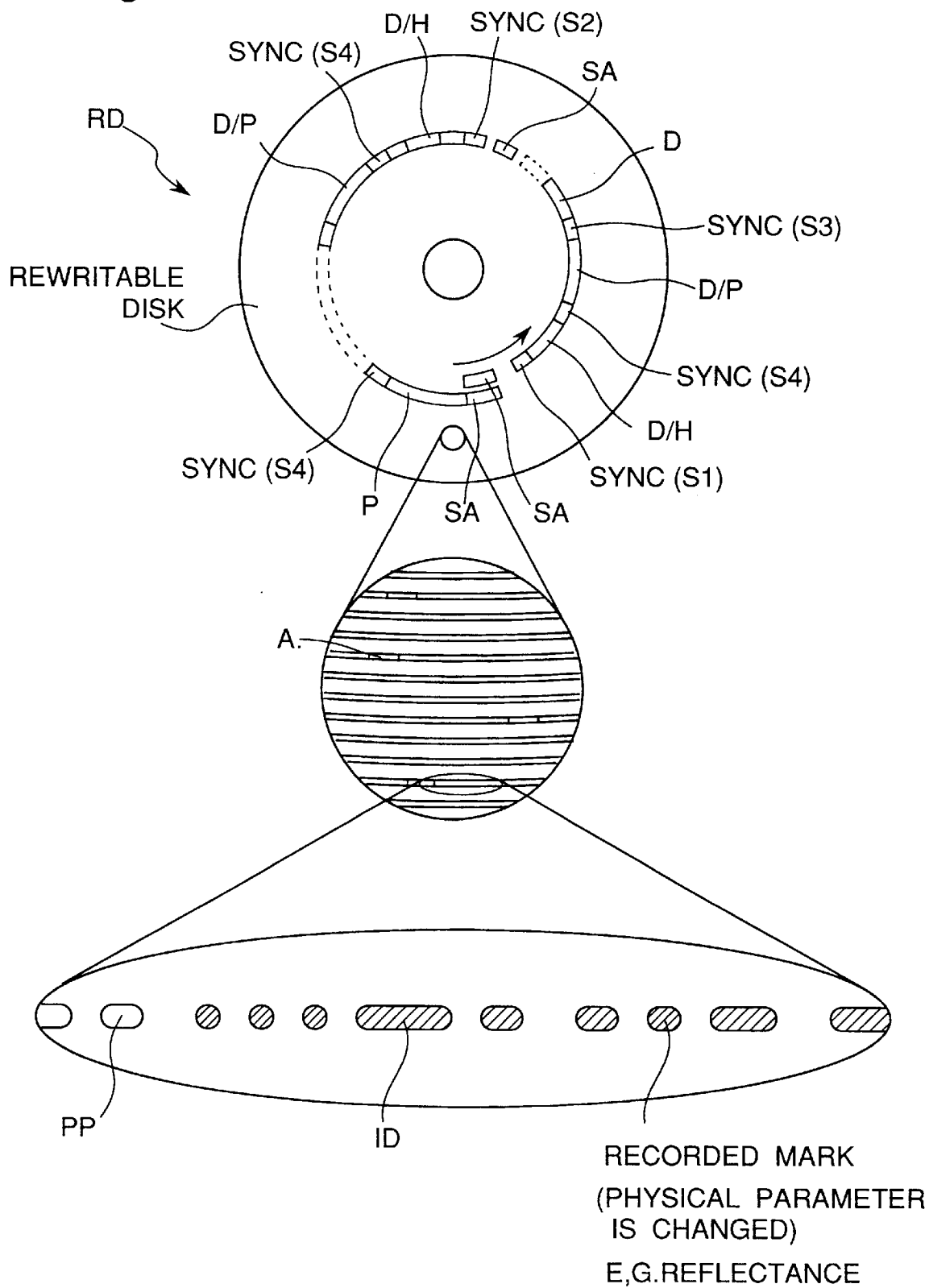
FIG. 18 is a plan view of an optical recording disk of a rewritable type particularly showing an arrangement of the markings according to the present invention.
Figure 19:
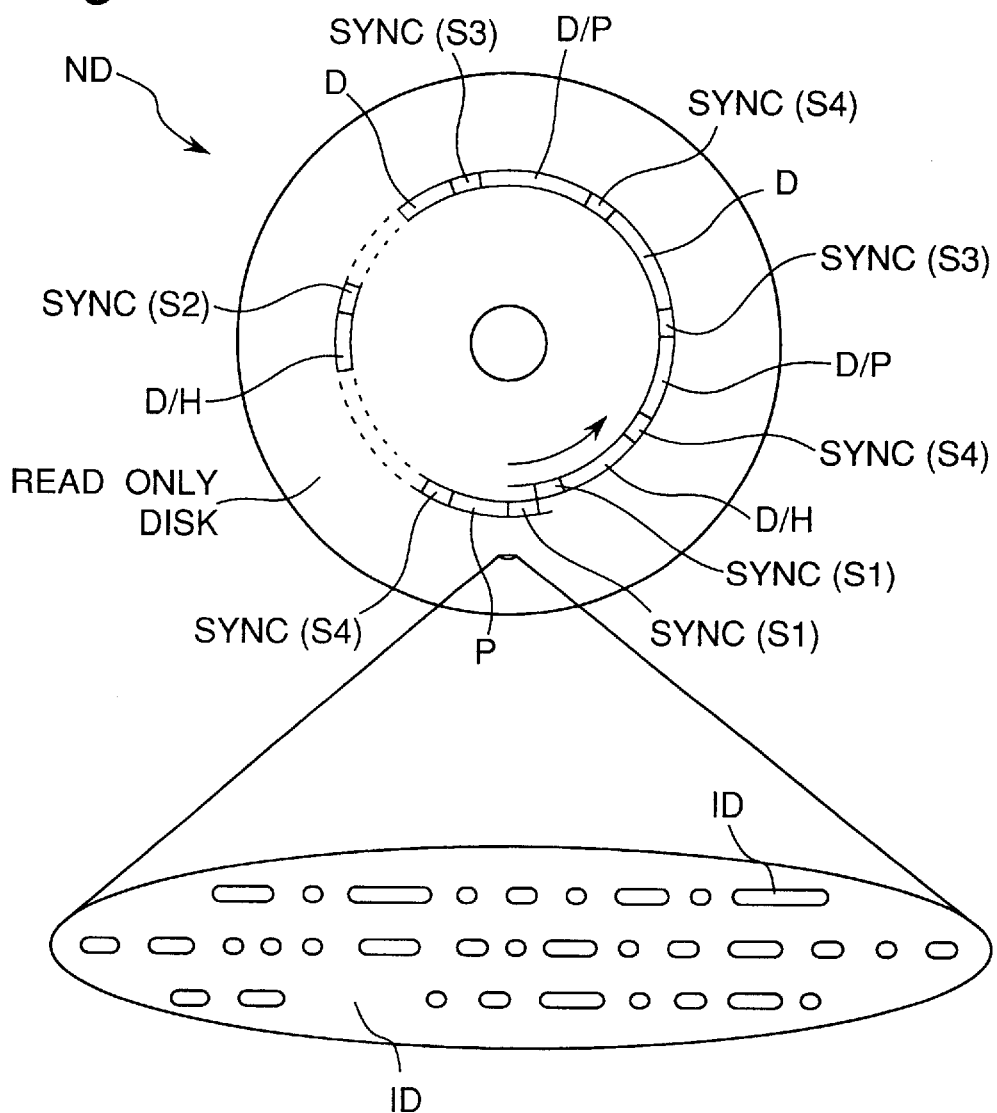
FIG. 19 is a plan view of an optical recording disk of a non-rewritable type particularly showing an arrangement of the markings according to the present invention.
Figure 20:
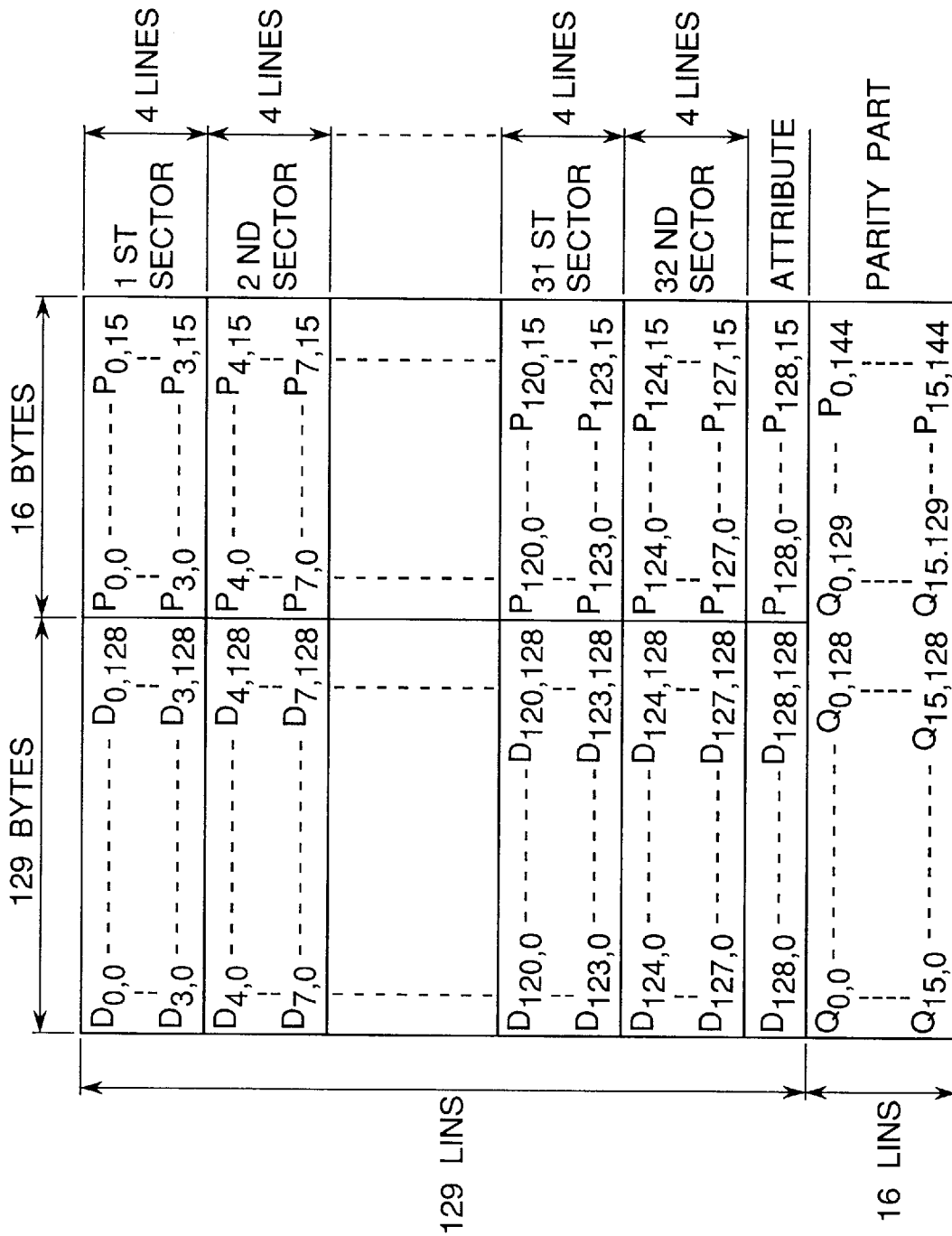
FIG. 20 shows the data format of the block used as the error correction processing unit according to the prior art.

FIGS. 18 and 19 show optical disks recorded with the NRZI channel signal according to the present invention. The optical disk shown in FIG. 18 is a rewritable disk RD (CAV), and the optical disk shown in FIG. 19 is a non-rewritable disk ND (CLV), i.e., a read only disk.

Referring to FIG. 18, the data stored in the rewritable disk RD is arranged as explained below.

A new rewritable disk RD without any recording has embossed with pre-pits along a track at predetermined locations. These pre-pits serve as addresses for accessing the disk. The recording is carried out by a laser beam which makes ON and OFF markings along the track. The markings may be done by changing the physical parameter, such as reflectance, of the disk surface. ON marking is the place where such a physical change is added, and OFF marking is the place where no such a physical change is added. As shown at the bottom of FIG. 18, according to a preferred embodiment of the present invention, the longest marking is the marking for the identifier ID which has a length of 14T. It is to be noted that in FIG. 18, the identifier ID is shown as formed by ON marking, but can be formed by OFF marking (a marking between two ON markings).

As shown in FIG. 18, in the rewritable disk RD, the recorded codes along the tracks are: sector address SA; synchronization code S1; data (such as video and audio data) and header codes D/H; synchronization code S4; data and parity codes D/P; synchronization code S3; data D; . . . sector address SA; synchronization code S2; data and header D/H; synchronization code S4; data and parity codes D/P; . . . synchronization code S4; and parity codes P.

According to a preferred embodiment of the present invention, the longest entry of the markings in the synchronization codes is the identifier ID, which has the length of 14T, and the longest entry of the marking in the disk other than in the synchronization codes is limited to 11T. Here the longest entry marking can be either ON marking or OFF marking.

As shown in FIG. 19, in the non-rewritable disk ND, the recorded codes along the tracks are: synchronization code S1; data (such as video and audio data) and header codes D/H; synchronization code S4; data and parity codes D/P; synchronization code S3; data D; synchronization code S4; data and parity codes D/P; synchronization code S3; data D; . . . synchronization code S2; data and header codes D/H; . . . synchronization code S4; and parity codes P.

According to a preferred embodiment of the present invention, the longest entry of the pits in the synchronization codes is the identifier ID, which has the length of 14T, and the longest entry of the pits in the disk other than in the synchronization codes is limited to 11T. Here the longest entry pits can be either an ON pit portion where the pits are formed or an OFF pit portion which is an interval between the pits.

Embodiment 2

Figure 8:
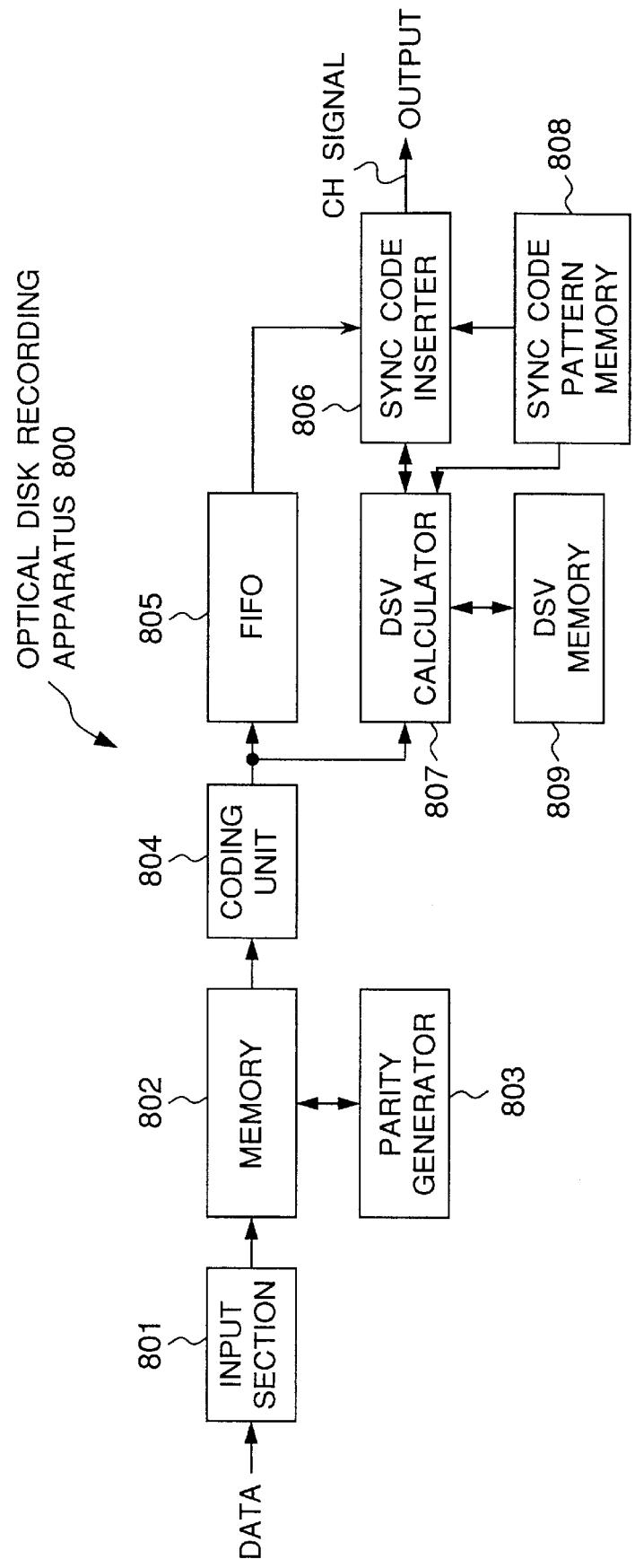
FIG. 8 is a block diagram of an optical disk recording apparatus according to the second embodiment of the present invention.

FIG. 8 is a block diagram of an optical disk recording apparatus 800 described below as the second embodiment of the present invention.

As shown in FIG. 8, this optical disk recording apparatus 800 comprises an input section 801, memory 802, a parity generator 803, coding unit 804, FIFO buffer 805, synchronization code inserter 806, DSV calculator 807, synchronization code pattern memory 808, and DSV memory 809.

The data to be recorded to the optical disk is input through the input section 801, which writes the input data one frame at a time to a particular position (address) in the memory 802.

The memory 802 stores non-synchronization code data formatted with a particular structure as shown in FIG. 1.

The parity generator 803 generates parity data corresponding to the row and column elements of the input data written in the format shown in FIG. 1 to a known address in the memory 802, and writes the generated parity data to a known address in the memory 802.

The coding unit 804 reads the non-synchronization code data written to the memory 802 sequentially from the beginning of the block, converts the read data to code words according to the 8–15 conversion table and conversion rules shown in FIGS. 2 and 3, and then writes the converted code words to the FIFO buffer 805.

The synchronization code inserter 806 counts the code words written to the FIFO buffer 805, and determines for each frame the type of synchronization code to be inserted at the beginning of each frame. After the synchronization code type information to be inserted at the beginning of the frame written to the FIFO buffer 805 is selected by the DSV calculator 807, the synchronization code inserter 806 reads the selected type information and the coding pattern of the fixed part of the synchronization code from the synchronization code pattern memory 808, and then generates the synchronization code by inserting the type information to a predetermined position in the fixed code part of the synchronization code. After outputting the generated synchronization code, the synchronization code inserter 806 reads and outputs the frame following said synchronization code from the FIFO buffer 805. The frame and synchronization code output from the synchronization code inserter 806 is then converted to an NRZI channel signal, and written to a particular address on the optical disk or other recording medium.

The DSV calculator 807 reads the coding pattern for the fixed part of the synchronization code, and type information 1 and 2 identifying the synchronization code type determined by the synchronization code inserter 806, from the synchronization code pattern memory 808, and generates the code sequences of the synchronization codes to which type information 1 and type information 2 are inserted. It then reads the code sequence input to the FIFO buffer 805 from the beginning of the frame following said synchronization code to the particular DSV comparison point in that frame, and generates the code word sequence for the case in which a synchronization code containing type information 1 is inserted to the beginning of the read code word sequence. A similar code word sequence is also generated for a synchronization code containing type information 2 inserted to the beginning of the read code word sequence.

The DSV calculator 807 then converts the two generated code word sequences to NRZI channel signals referenced to the signal level of the NRZI channel signal stored to the DSV memory 809, and calculates the DSV of the NRZI channel signal corresponding to the two code word sequences from the DSV value stored to the DSV memory 809. The DSV calculator 807 then compares the absolute values of the two DSV calculation results at the end of the code word sequence, i.e., at the DSV comparison point of the frame following the synchronization code, and selects the type information resulting in the DSV calculation result with the smallest absolute value at the DSV comparison point. The DSV calculator 807 then updates the content stored to the DSV memory 809 with the DSV calculation result having the lowest absolute value at the DSV comparison point, and the signal level at the DSV comparison point of the NRZI channel signal in which the absolute value of the DSV calculation result is lowest. Then, based on the content stored to the updated DSV memory 809, the DSV calculator 807 again calculates the DSV as described above from the DSV comparison point to the end of the frame, and again updates the content of the DSV memory 809 with that calculation result and the NRZI channel signal level at the end of the frame.

The synchronization code pattern memory 808 stores the code sequence of the fixed part of the synchronization code shown in FIG. 4, and the 5-bit patterns of type information 1 and 2 corresponding to the synchronization code type (S1–S4) shown in FIG. 6. The DSV memory 809 stores the DSV value updated by the DSV calculator 807, and the level of the corresponding NRZI channel signal.

Figure 9:
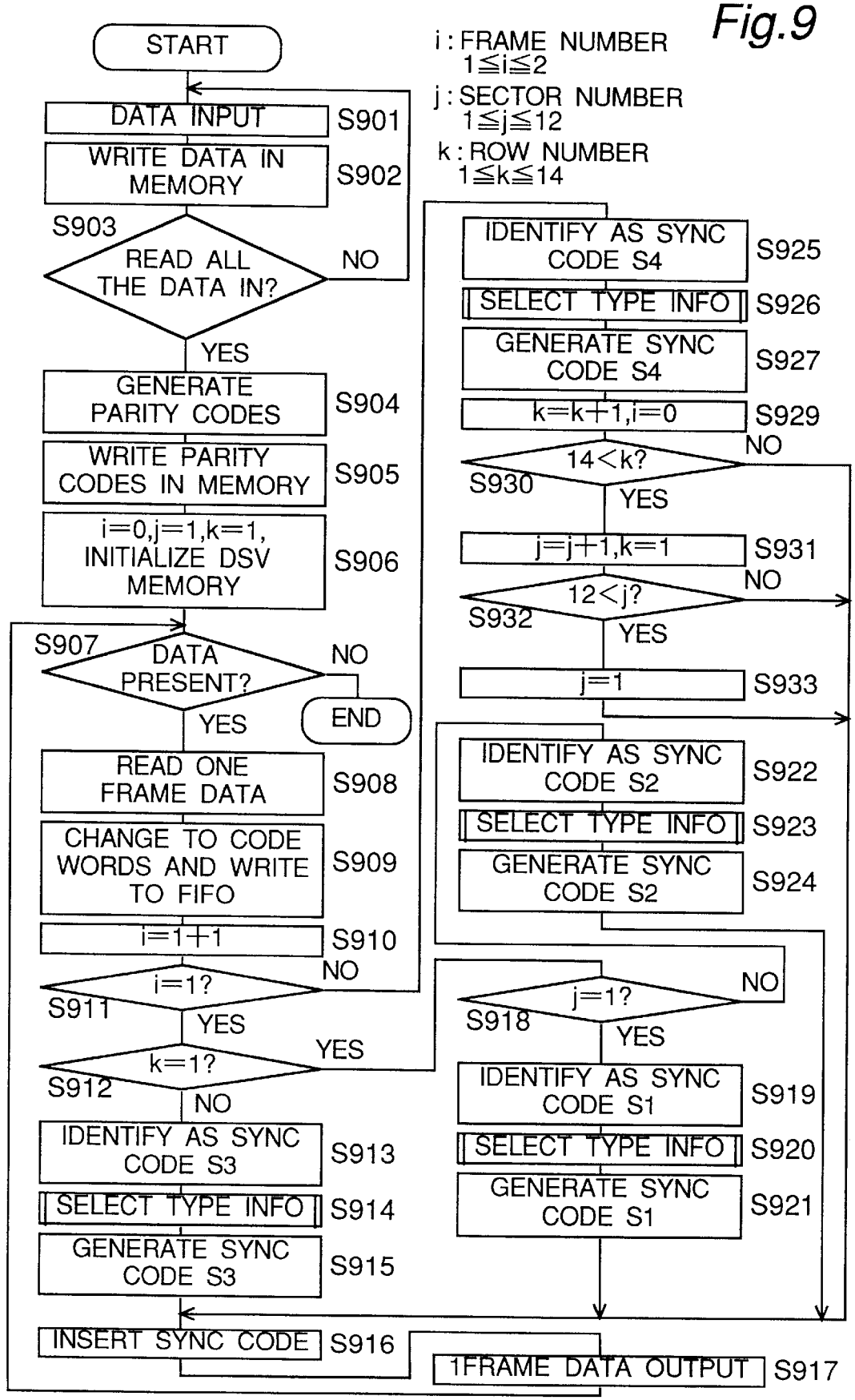
FIG. 9 is a flow chart showing the process executed by the optical disk recording apparatus of the second embodiment.

FIG. 9 is a flow chart of the process executed to record the data containing a synchronization code thus generated in an optical disk recording apparatus according to the present embodiment of the invention.

The data input to the input section 801 (step S901) is sequentially written frame by frame to a known address in the memory 802 (step S902). When all of the data is written to the memory 802 (step S903), parity data is generated for the row and column elements of the data stored to the memory 802 (step S904), and the generated parity data is then written to a known address in the memory 802 (step S905).

The synchronization code inserter 806 initializes each of the parameters used to evaluate the type of the synchronization code to be inserted at the beginning of the data read from the memory 802. The DSV calculator 807 also initializes the content stored to the DSV memory 809.

More specifically, the parameters i, j, and k are initialized to the values i=0, j=1, and k=1, where i is the parameter for tracking whether the frame read from the memory 802 is frame 1 (i=1) or frame 2 (i=2) (the frame count parameter i); k (1≦k≦14) is the parameter for counting the number of rows in each frame (the row count parameter k); and j (1≦j≦12) is the parameter for counting the sector number (the sector count parameter j). The initialization values of the NRZI channel signal level and the initial DSV value stored to the DSV memory 809 are, for example, LOW and zero (0), respectively (step S906).

If unprocessed data remains in the memory 802 (step S907), the coding unit 804 reads one frame of data from the memory 802 using a known data processing unit (step S908), codes the read data to code word sequences comprising a 15-bit code word for each eight bits of read data using 8–15 conversion, and writes the resulting code word sequence to the FIFO buffer 805 (step S909).

When a code word sequence for one frame of data is written to the FIFO buffer. 805, the synchronization code inserter 806 increments the frame counter parameter i (step S910).

If the frame count parameter i=1 (step S911), the row count parameter k=1 (step S912), and the sector count parameter j=1 (step S918), the synchronization code inserter 806 determines that the type of the synchronization code that should be inserted to the beginning of the frame written to the FIFO buffer 805 is synchronization code S1, i.e., the synchronization code indicating the beginning of a data block (step S919).

Using the synchronization code type (synchronization code S1 in this example) determined by the synchronization code inserter 806 inserted to the beginning of frame 1 written to the FIFO buffer 805, the DSV calculator 807 then calculates the DSV value at the DSV comparison point in frame 1 using is both type information 1 and type information 2 inserted to the selected synchronization code S1, and selects the type information yielding the DSV value with the lowest absolute value at the DSV comparison point in frame 1 (step S920). Note that the process executed in step S920 is described in greater detail below with reference to FIG. 10.

The synchronization code inserter 806 then generates a synchronization code with the type information selected by the DSV calculator 807 (step S921).

The synchronization code inserter 806 then reads frame 1 from the FIFO buffer 805, inserts the generated synchronization code to the beginning of the frame (step S916), outputs that frame (step S917), and then loops back to step S907.

If in step S911 the frame count parameter i=1 and in step S912 the row count parameter k=1 and the sector count parameter j≠1 in step S918, the synchronization code inserter 806 determines that the type of synchronization code to be inserted to the beginning of the frame written to the FIFO buffer 805 is synchronization code S2, i.e., the synchronization code identifying the beginning of a sector (step S922).

The DSV calculator 807 then selects the type information of synchronization code S2 in step S922 using the same process executed in step S923.

The synchronization code inserter 806 then generates a synchronization code S2 containing the type information selected by the DSV calculator 807 (step S924), and loops back to step S916.

If, however, the sector count parameter k·1 in step S912, the synchronization code inserter 806 determines that the type of the synchronization code to be inserted to the beginning of the frame written to the FIFO buffer 805 is synchronization code S3, i.e., the synchronization code identifying the beginning of a row other than the first row in the data block or sector (step S913).

The DSV calculator 807 then selects the type information of synchronization code S3 in step S914 using the same process executed in step S920.

The synchronization code inserter 806 then generates a synchronization code S3 containing the type information selected by the DSV calculator 807 (step S915), and loops back to step S916.

If in step S911 the frame count parameter i=2, i.e., i≠1, the synchronization code inserter 806 determines that the type of synchronization code to be inserted to the beginning of the frame written to the FIFO buffer 805 is synchronization code S4, i.e., the synchronization code written to the middle of each row and identifying the beginning of frame 2 (step S925).

The DSV calculator 807 then selects the type information of synchronization code S4 in step S926 using the same process executed in step S914.

The synchronization code inserter 806 then generates a synchronization code S4 containing the type information selected by the DSV calculator 807 (step S927).

The synchronization code inserter 806 then resets the frame count parameter i to 0 (i=0), because the next frame written to the FIFO buffer 805 will be frame 1 in the next row, and increments the sector count parameter k (step S929).

If the value of the row count parameter k is 14<k (step S930), the next frame written to the FIFO buffer 805 will be the first frame in the next sector, and the sector count parameter j is therefore incremented, and the row count parameter k is reset to 1 (step S931). If step S930 returns NO, i.e., if the row count parameter k is not greater than 14, the process skips forward to step S916.

If at step S932 the sector count parameter j is also 12<j as the result of the increment at step S931, the frame next written to the FIFO buffer 805 will be the first frame 1 in the next data block. The sector count parameter j is therefore reset to j=1 (step S933), and the process returns to step S901.

Step S916 loops back to step S907, and if there is no unprocessed data left in the memory 802, the coding unit 804 terminates processing.

Figure 10:
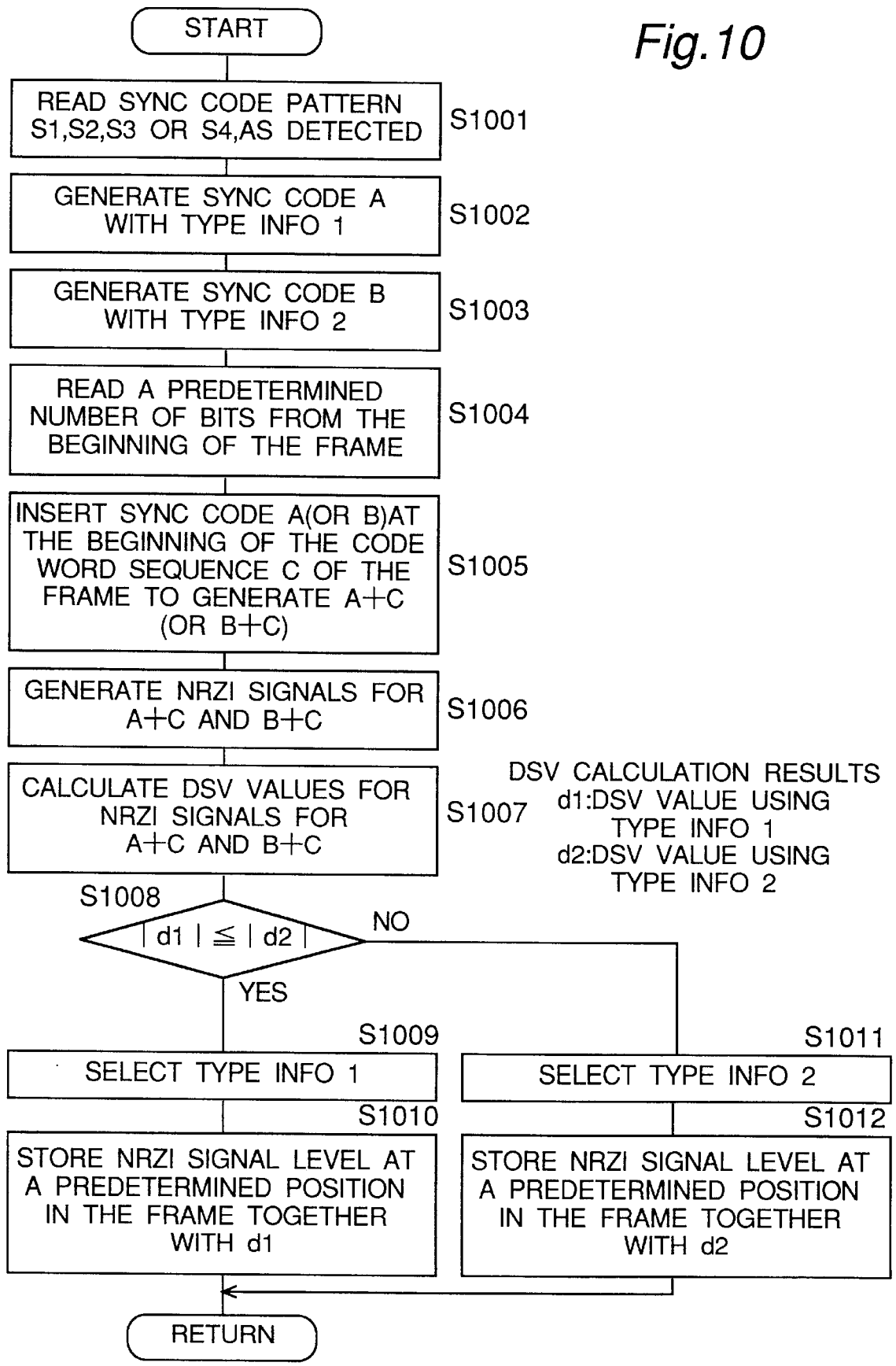
FIG. 10 is a flow chart showing the detail of the type information selection process in steps S914, S920, S923, and S926 in FIG. 9.

FIG. 10 is a flow chart of the type information selection process executed in steps S914, S920, S923, and S926 in FIG. 9.

The DSV calculator 807 reads the 5-bit patterns of type information 1 and 2 indicating the type determined by the synchronization code inserter 806, and the coding pattern of the fixed part of the synchronization code, from the sync code pattern memory 808 (step S1001).

The DSV calculator 807 then generates a code sequence A expressing the synchronization code of a determined type by inserting the read 5-bit pattern for type information 1 to bits 22–26 (the fixed part of the coding pattern) of the simultaneously read synchronization code (step S1002).

The DSV calculator 807 likewise generates a code sequence B expressing the synchronization code of the determined type by inserting the read 5-bit pattern for type information 2 to bits 22–26 (the fixed part of the coding pattern) in the simultaneously read synchronization code (step S1003).

The DSV calculator 807 then reads the code word sequence C from the beginning of the frame stored to the FIFO buffer 805 to a predetermined DSV comparison point (step S1004)

The DSV calculator 807 then generates the two code sequences A+C and B+C by inserting the synchronization code sequences A and B generated in steps S1002 and S1003 to the beginning of the code word sequence C of the frame read from the FIFO buffer 805 (step S1005).

The DSV calculator 807 then generates NRZI channel signals corresponding to the generated code sequences A+C and B+C based on the NRZI channel signal level, stored in the DSV memory 809, of the bit immediately before the synchronization code (step S1006).

The DSV calculator 807 then calculates the DSV values for the NRZI channel signals corresponding to code sequences A+C and B+C based on the DSV values of the bit immediately before the synchronization code as stored in the DSV memory 809 (step S1007).

The DSV calculator 807 then compares the absolute values |d1| and |d2| where d1 is the DSV calculation result at the end of the NRZI channel signal generated for code sequence A+C containing type information 1, and d2 is the DSV calculation result at the end of the NRZI channel signal generated for code sequence B+C containing type information 2.

If $|d1| \leq |d2|$ (step S1008), type information 1 is selected (step S1009). The DSV calculator 807 then updates the content of the DSV memory 809 by writing the NRZI channel signal level at the end of the NRZI channel signal generated for code sequence A+C containing type information 1, and DSV calculation result d1, to the DSV memory 809, and terminates the type information selection process (step S1010).

However, if $|d1| > |d2|$, i.e., step S1008 returns NO, the DSV calculator 807 selects type information 2 (step S1011). The DSV calculator 807 then updates the content of the DSV memory 809 by writing the NRZI channel signal level at the end of the NRZI channel signal generated for code sequence B+C containing type information 2, and DSV calculation result d2, to the DSV memory 809, and terminates the type information selection process (step S1012).

It is therefore possible by means of the present embodiment to achieve an optical disk recording apparatus 800, and a recording method therefor, for recording to an optical disk or other recording medium data containing a synchronization code that can be accurately and reliably discriminated from the non-synchronization code data, and having various functions.

It should be noted that the recording medium referenced above may be thought of as a transmission path for transmitting said data and synchronization code sequence recorded by said recording apparatus to the reproduction apparatus. An alternative embodiment of the present invention therefore provides a transmission method for transmitting to a transmission path data containing a synchronization code that can be accurately and reliably discriminated from the non-synchronization code data, and having various functions, as described in the first embodiment above.

Embodiment 3

Figure 11:
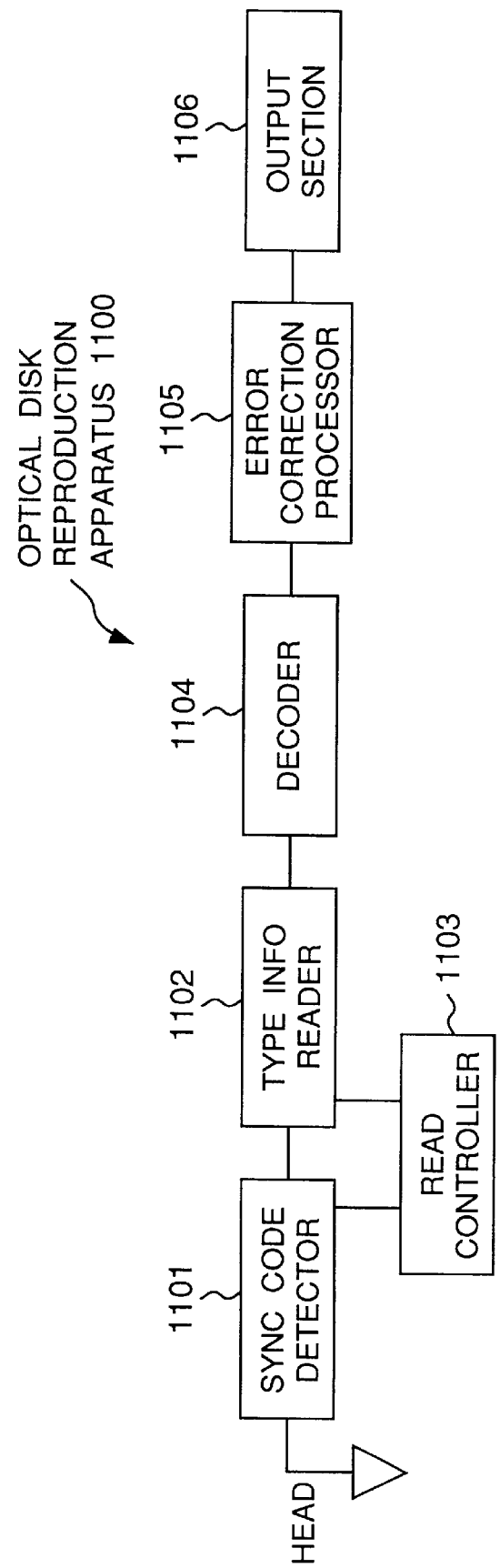
FIG. 11 is a block diagram of an optical disk reproduction apparatus according to a third embodiment of the present invention.

FIG. 11 is a block diagram of an optical disk reproduction apparatus 1100 according to a third embodiment of the present invention. As shown in FIG. 11, this optical disk reproduction apparatus 1100 comprises a synchronization code detector 1101, a type information reader 1102, a read controller 1103, a decoder 1104, an error correction processor 1105, and an output section 1106.

The synchronization code detector 1101 obtains the data containing a synchronization code as described above from the optical disk to which it is recorded as the reproduction signal, digitizes said reproduction signal, converts the digitized signal to an NRZI channel signal, demodulates said NRZI channel signal to a code word sequence (parallel data) comprising 15-bit code words, and outputs to the type information reader 1102. The synchronization code detector 1101 also identifies any signal segment in the demodulated NRZI channel signal in which the inversion interval is 16T or greater as the synchronization code identifier, and outputs a synchronization code detection signal to the type information reader 1102. When an NRZI channel signal segment with a 16T or greater inversion interval is discriminated, the synchronization code detector 1101 also outputs a set signal to the read controller 1103.

The type information reader 1102 is, in practice, identical to the decoder 1104, but reads as the data to be processed the code word supplied from the synchronization code detector 1101 immediately after the synchronization code identifier is discriminated, i.e., the code word containing the synchronization code type information immediately following the synchronization code detection signal output. The read type information is output to the read controller 1103.

The read controller 1103 detects and corrects read clock phase error at each inversion of the NRZI signal, and synchronizes the first bit of the code word output from the synchronization code detector 1101 to the type information reader 1102 each time the synchronization code detector 1101 identifies the synchronization code identifier (i.e., the NRZI channel signal segment where inversion interval TS=16T), i.e., at the set signal timing. The read controller 1103 then reads the content of the data decoded by the decoder 1104 to control the reproduction operation executed by the components of the optical disk reproduction apparatus 1100.

The decoder 1104 reverses the 8–15 conversion process using a data processing unit comprising a predetermined quantity of the 15-bit code words supplied from the synchronization code detector 1101, and writes the result to a known address in a memory (which is not shown).

The error correction processor 1105 then reads the parity data from the converted data written to said known address in memory (which is not shown), and applies error correction processing to each data block. The data stored to memory is then updated using the error corrected data.

The output section 1106 then sequentially reads and outputs the error-corrected data from the memory not shown.

Figure 12:
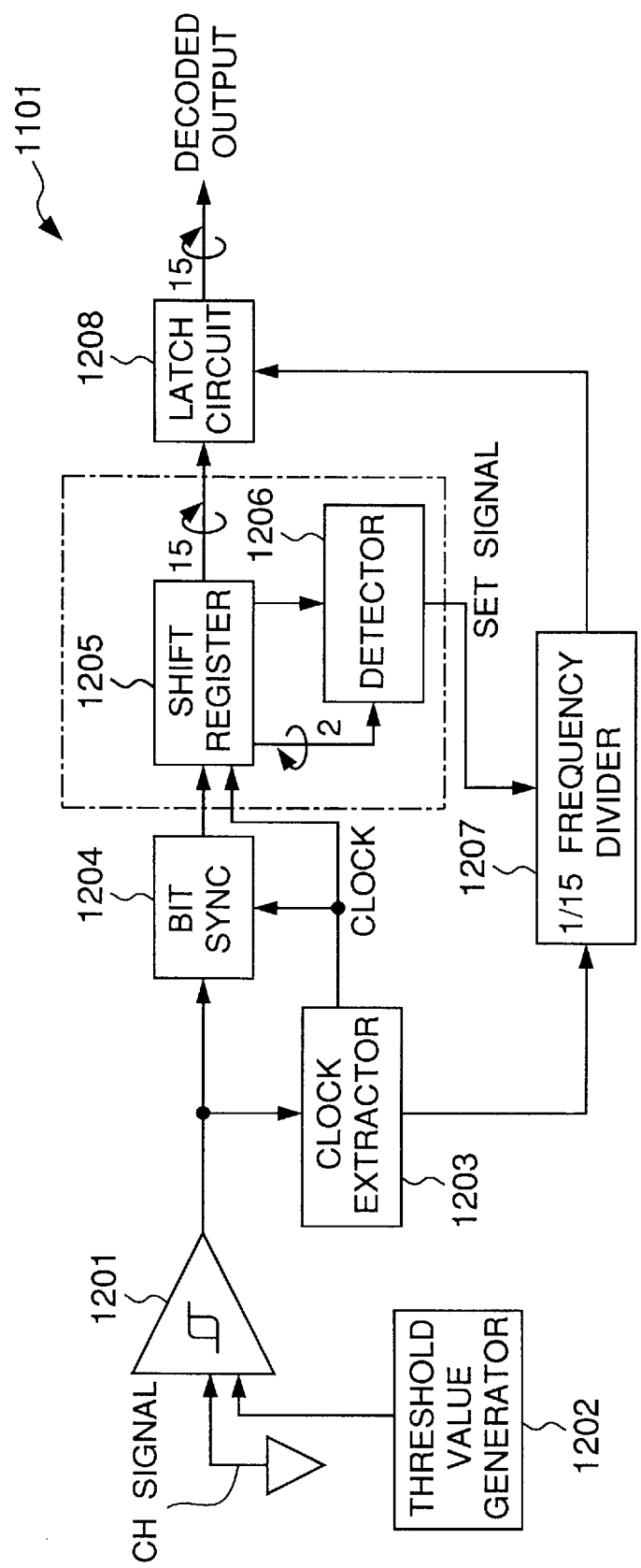
FIG. 12 is a block diagram showing the detail of the synchronization code detector and read controller shown in FIG. 11.

FIG. 12 is a block diagram showing a specific hardware configuration of the synchronization code detector 1101 and read controller 1103 shown in FIG. 11.

The synchronization code detector 1101 and read controller 1103 comprise a comparator 1201, threshold level generator 1202, clock extractor 1203, bit synchronizer 1204, shift register 1205, detector 1206, $1/15^{th}$ frequency divider 1207, and latch circuit 1208.

The comparator 1201 compares the reproduction signal reproduced from the optical disk with the read threshold level input from the threshold level generator 1202, and digitizes the input reproduction signal by converting signal values in the reproduction signal equal to or exceeding the read threshold level to HIGH bits, and signal levels below the read threshold level to LOW bits.

The threshold level generator 1202 generates the read threshold level used by the comparator 1201.

The clock extractor 1203 is a phase-lock loop (PLL) for generating the read clock from the output signal of the comparator 1201, and synchronizing the period and phase of the read clock so that the output of the comparator 1201 inverts at the reference position, which is the midpoint of the PLL-generated read clock.

The bit synchronizer 1204 samples the comparator output at the timing of the read clock from the clock extractor 1203, converts the reproduction signal to an NRZI channel signal, and then demodulates the resulting NRZI channel signal to an NRZ (non-return to zero) signal.

The shift register 1205 sequentially inputs the NRZ signal expressing the code word as serial data at the read clock timing from the clock extractor 1203, converts 18 bits of the NRZ signal to parallel data, and outputs the result to the detector 1206. Fifteen consecutive bits in the shift register output are also output to the latch circuit 1208.

When a code sequence corresponding to the 16T inversion interval of the NRZI channel signal, i.e., the code sequence (100000000000000001) containing a fifteen bit run of zeroes (0), or a code sequence corresponding to the 17T inversion interval of the NRZI channel signal, i.e., the code sequence (1000000000000000001) containing a sixteen bit run of zeroes (0), is input, the detector 1206 outputs the synchronization code detection signal indicating that the synchronization code identifier was identified to the type information reader 1102 (not shown in FIG. 12). When the code sequence (100000000000000001) corresponding to the 16T inversion interval of the NRZI channel signal is input, a set signal is also output to the $1/15^{th}$ frequency divider 1207.

The $1/15^{th}$ frequency divider 1207 generates the word clock by $1/15^{th}$ frequency dividing the read clock. The $1/15^{th}$ frequency divider 1207 also synchronizes the word clock phase so that the word clock rise (or fall) is output before the third read clock from the set signal output, i.e., at the twelfth read clock from the set signal.

The latch circuit 1208 holds the 15-bit parallel data from the shift register 1205 at the word clock timing from the $1/15^{th}$ frequency divider 1207, and outputs to the decoder 1104.

Figure 13:
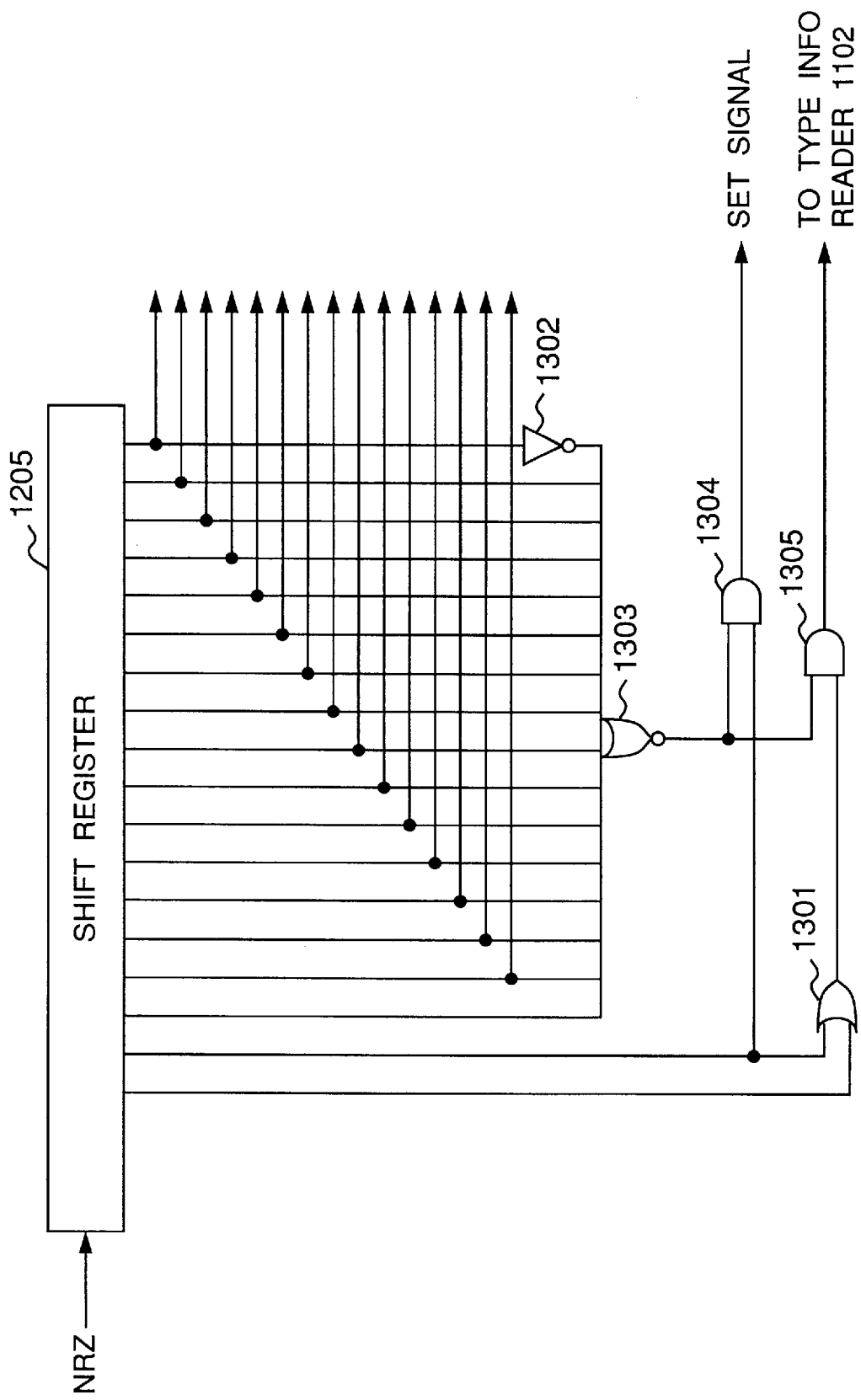
FIG. 13 is a block diagram of the shift register and detector shown in FIG. 12.

FIG. 13 is a block diagram of the hardware configuration of the shift register 1205 and detector 1206 shown in FIG. 12. Note that in FIG. 13 the high bit of the code sequence output from the shift register 1205 is shown on the right, and the low bit is on the left. In addition, the $n^{th}$ bit counted from the highest bit (most significant bit) in the output of the shift register 1205 is referenced as simply bit n below.

The detector 1206 comprises an OR gate 1301, an inverter 1302, a NOR gate 1303, and AND gates 1304 and 1305.

Bits 17 and 18 of the parallel data output from the shift register 1205 are input to the OR gate 1301, which outputs 1 when either of the inputs is 1.

Bit 1 of the parallel data output from the shift register 1205 is input to the inverter 1302, which inverts the bit and outputs the inverted bit.

Bits 1 through 16 of the parallel data output from the shift register 1205 are input to the NOR gate 1303, with bit 1 input through the inverter 1302. If all input bits are 0, the NOR gate 1303 outputs 1.

The output from the NOR gate 1303, and bit 17 of the parallel data output from the shift register 1205, are input to the one AND gate 1304, which outputs 1 if both of the inputs are 1.

The outputs from the NOR gate 1303 and the OR gate 1301 are input to the other AND gate 1305, which also outputs 1 if both of the inputs are 1.

The overall operation of the process executed by the detector 1206 thus comprised is described in greater detail below.

As shown in FIG. 13, bit 1 of the shift register output is input through the inverter 1302, while bits 2–16 are input directly, to the NOR gate 1303. As a result, the NOR gate 1303 outputs 1 when bit 1 in the shift register 1205 is 1 and bits 2–16 are all 0. The output from the NOR gate 1303 and bit 17 from the shift register 1205 are input to the AND gate 1304. As a result, the AND gate 1304 outputs 1 only when bits 1 and 17 of the shift register output are 1s, and all bits 2–16 are 0s.

This bit sequence corresponds to the code sequence for the synchronization code identifier expressed by an inversion interval TS=16T in the NRZI channel signal. An output of 1 from the AND gate 1304 indicates that the synchronization code and other data were correctly read, and is used as the set signal for synchronizing the phase of the $1/15^{th}$ frequency divider 1207. As a result, a 1 is not output as the set signal when TS=17T due to a ±T shift in the NRZI channel signal inversion interval TS caused by noise or other factor.

Bits 17 and 18 in the shift register output are input to the OR gate 1301. The outputs from the NOR gate 1303 and OR gate 1301 are input to the AND gate 1305. The AND gate 1305 thus outputs 1 if bit 1 is 1, bits 2–16 are all 0, and either bit 17 or 18 is 1 in the shift register output. Thus, a 1 is output as the synchronization code detection signal even when TS=17T due to a ±T shift in the NRZI channel signal inversion interval TS caused by noise or other factor. In addition, an output of 1 from the AND gate 1305 indicates that even if a slight read error occurs when reading the data containing the synchronization code, the synchronization code was correctly discriminated from the other data, and the read error that occurred is within the correction capacity of the error correction processor. The output from the AND gate 1305 is therefore output to the type information reader 1102 as the synchronization code detection signal.

The synchronization code identifier can thus be detected even when TS=17T due to a +T shift in the NRZI channel signal inversion interval TS caused by noise or other factor, and the synchronization code type information can be read. Furthermore, because it is not possible to detect whether the shift in the inversion position occurred at the rise or fall of the NRZI channel signal corresponding to the synchronization code identifier when the NRZI channel signal inversion interval TS=17T, the synchronization code of which the identifier has an inversion interval TS of 17T in the NRZI channel signal is not suited for use detecting the first bit in the code word. It is therefore possible to accurately read the code words of the data in the code word sequence by detecting the first code word bit using only the identifier of a synchronization code in which read error did not occur.

As shown in FIG. 1, according to this embodiment, a sector address SA is provided immediately after each of the synchronization codes S1 and S2. The sector address SA includes 4-byte address part, 2-byte error correction part and 6-byte attribute part. In each sector address, the address of the block and the address of the sector is stored. Furthermore, at the end of each sector and before the parity portion, 4-byte error detection code EDC is provided for checking the error in the data area.

Figure 14:
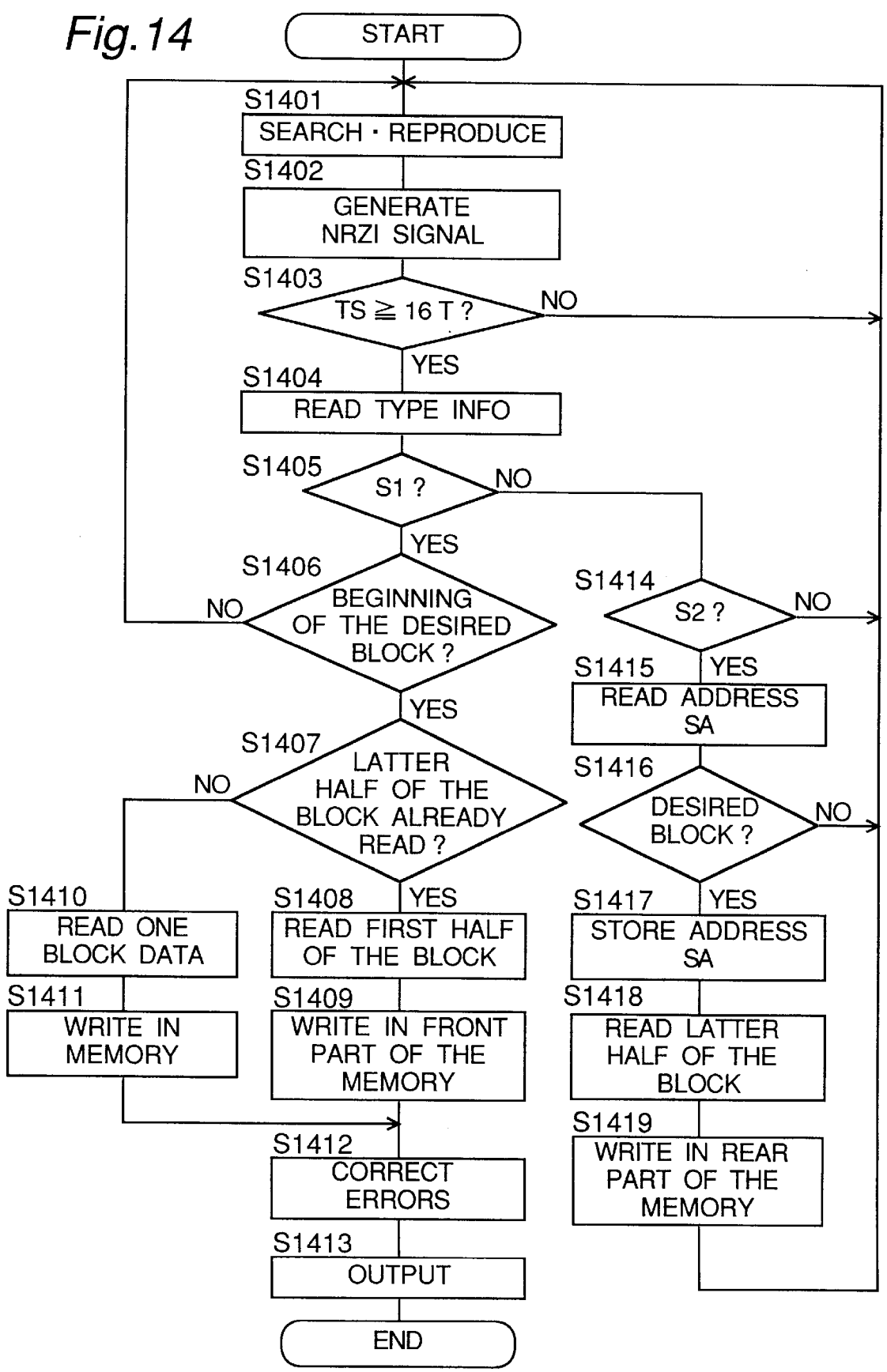
FIG. 14 is a flow chart showing the data reproduction process executed by the optical disk reproduction apparatus 1100 according to the present invention.

The reproduction process executed by the optical disk reproduction apparatus 1100 according to the present embodiment of the invention is described in greater detail below with reference to the flow chart thereof in FIG. 14.

The process starts when the reproduction signal of the data and synchronization code recorded to the optical disk as described above are reproduced by the reproduction head of the optical disk reproduction apparatus 1100, and input to the synchronization code discriminator 1101 (step S1401).

The synchronization code discriminator 1101 extracts an NRZI channel signal from the reproduction signal and demodulates the NRZI channel signal to an NRZ signal (step S1402), discriminates the synchronization code identifier contained in the NRZ signal, i.e., discriminates the signal segment where the signal length TS of the inversion interval of the corresponding NRZI channel signal is TS≧16T, and outputs the synchronization code detection signal to the type information reader 1102 (step S1403).

The type information reader 1102 decodes the code word read immediately after the synchronization code detection signal is output as the code word part of the synchronization code, and thus discriminates the synchronization code type (step S1404).

If the synchronization code of the identified type is synchronization code S1 (step S1405), it is detected whether the accessed synchronization code S1 is the beginning of the desired block (step S1406) or not. If so, it is detected whether the data in that block from some midpoint therein to the end thereof, i.e., a latter half portion, has already been read (step S1407). If the latter half portion is already read and stored, the read controller 1103 reads the data from the beginning of that block to the sector address SA that has been detected and stored in step S1417 (step S1408), i.e., a first half portion, and inserts the read data in front of the data already read into memory (step S1409). In this manner, the first half portion and the latter half portion of the data are coupled together to form a complete one block data.

If no latter half portion of the data is read and stored into memory (step S1407), the read controller 1103 reads one complete block of data to just before the next synchronization code S1 (step S1410), and writes the data to memory (step S1411).

The error correction processor 1105 then applies error correction processing to the block of data written to memory (step S1412).

The error-corrected data is then sequentially read from memory and output (step S1413).

If the synchronization code of the identified type is not synchronization code S1 (step S1405), and the synchronization code of the identified type is synchronization code S2, that is, if the accessed point is at the synchronization code S2 located at a midpoint of the desired block (step S1414), the read controller 1103 reads the sector address SA following the synchronization code S2 to determine whether the accessed sector is a sector in the desired block (step S1415).

If the accessed sector is a sector in the desired block based on the read sector address SA (step S1416), the sector address SA is separately stored (step S1417), the read controller 1103 reads the data from the accessed sector to just before the next synchronization code S1 (step S1418), i.e., a latter half of the block, and writes the data to particular address in memory (step S1419), and then loops back to step S1401.

It is therefore possible by means of the present embodiment to achieve a method for reading from the recording medium data containing a synchronization code that can be accurately and reliably discriminated from the non-synchronization code data, and having various functions. It is therefore possible by means of this reading method to search and accurately read data recorded to an optical disk or other recording medium at high speed, to correct read errors that may occur with a high error correction capability, and output accurate data.

Said recording medium may also be thought of as a transmission path for transmitting to a reproduction apparatus the data and synchronization code recorded by the recording apparatus according to the present invention. It is therefore possible by means of the present embodiment to achieve a reading method for reading from a transmission path data containing a synchronization code that can be accurately and reliably discriminated from the non-synchronization code data, and having various functions, as described in the first embodiment above according to the present invention.

While the DSV is separately tabulated in each data block, it is also possible to tabulate the DSV through a period of plural blocks recorded consecutively to the recording medium by clearing the DSV to zero before the first block in the sequence.

Embodiment 4

A recording medium to which data containing a synchronization code whereby the position of each frame in a sector can be determined by reading the synchronization code type is described as an alternative embodiment of the invention with reference to FIGS. 15–17 below.

Figure 15A:
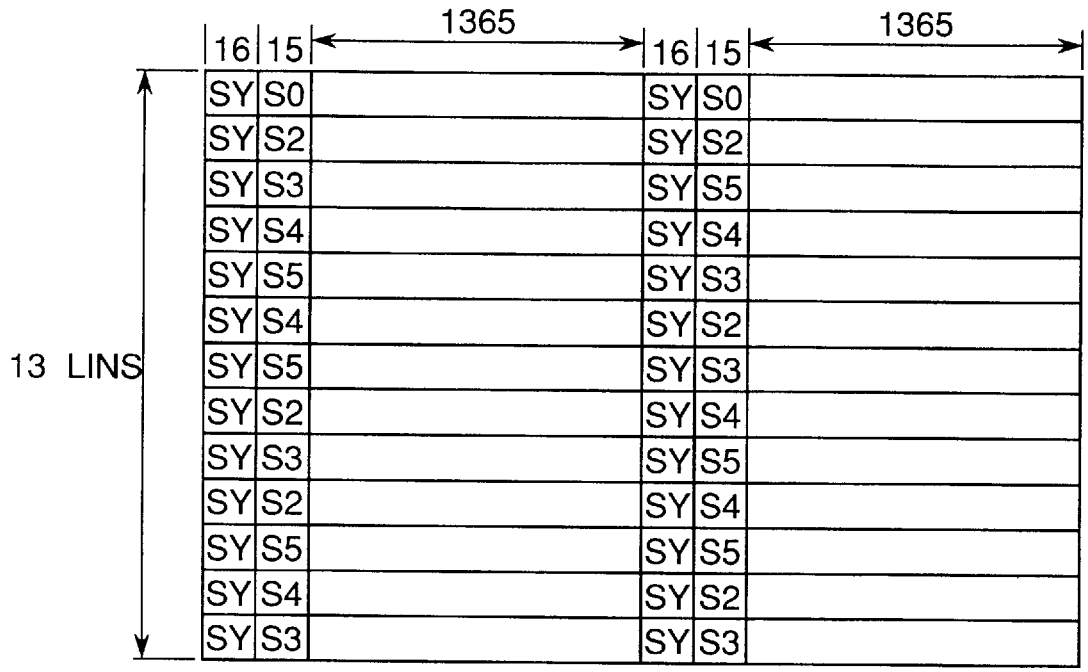
FIGS. 15A and 15B are diagrams showing the data structure of the data and synchronization code before modulation for recording to the recording medium according to an alternative embodiment of the invention.
Figure 15B:
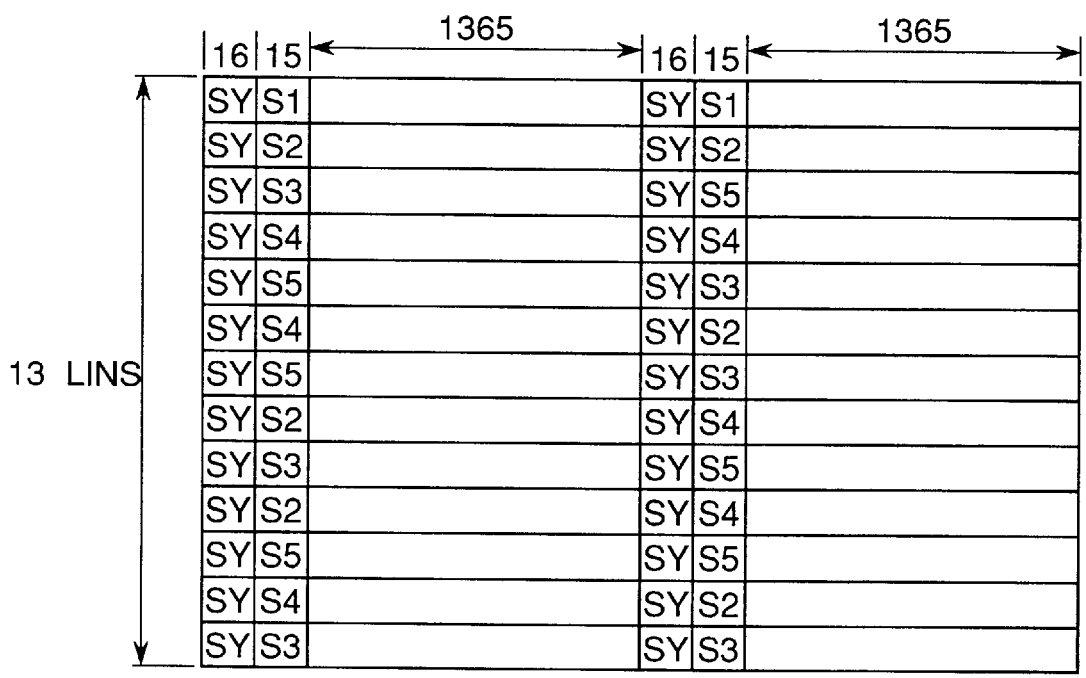

FIGS. 15A and 15B show the data structure of the data and synchronization code before modulation for recording to the recording medium according to the present embodiment. Specifically, FIG. 15A shows the data and synchronization code format in the first physical sector of the data block, and FIG. 15B shows the data and synchronization code format in the non-first physical sectors of the data block. Note that each of FIGS. 15A and 15B shows a conceptual two-dimensional array of the data in one sector.

The data cum synchronization code is coded, modulated, and written to the optical disk in error correction processing units of one block comprising twelve sectors. Each data frame contains 91 bytes of data converted by 8–15 conversion to 1365 channel bits of data, and each sector comprises thirteen lines of two frames each. A 31-channel bit synchronization code SYS0–SYS5 is inserted to the beginning of each frame.

Synchronization code SYS0 identifies the sector containing synchronization code SYS0 as the first sector in the block, and each line containing synchronization code SYS0 as the first line in that sector.

Synchronization code SYS1 identifies the sector containing synchronization code SYS1 as a sector other than the first sector in the block, and each line containing synchronization code SYS1 as the first line in that sector.

Synchronization codes SYS0–SYS5 indicate by the combination of two consecutive types S0–S5 whether the frame following the synchronization code SYS0–SYS5 of the second type is the first frame or second frame in the sector.

More specifically, if the numeric part of the references S1–S5 expressing the synchronization code type are called the "type number," the type number of synchronization code SYS1 is 1, and the type number of synchronization code SYS2 is 2. Note, however, that synchronization code SYS0 is treated as having a type number of 1. As shown in FIG. 15, the synchronization codes SYS0–SYS5 are assigned such that when the type numbers of any two consecutive frames in a sector add to an odd sum, the frame following the synchronization code containing the second type number is the first frame in the line; when two consecutive type numbers add to an even sum, the frame following the synchronization code containing the second type number is the second frame in the line.

Using combinations of three consecutive types S0–S5, the synchronization codes SYS0–SYS5 can also be used to identify the position in the sector of the frame following the synchronization code SYS0–SYS5 of the third type number.

More specifically, the synchronization codes SYS0–SYS5 are assigned such that any combination of three consecutive type numbers S0–S5 will not appear twice in the same sector. It is therefore possible to determine the position of each frame in each sector by storing the position of the frame following the synchronization code SYS0–SYS5 of the third type number according to the combinations of three consecutive type numbers S0–S5.

Figure 16:
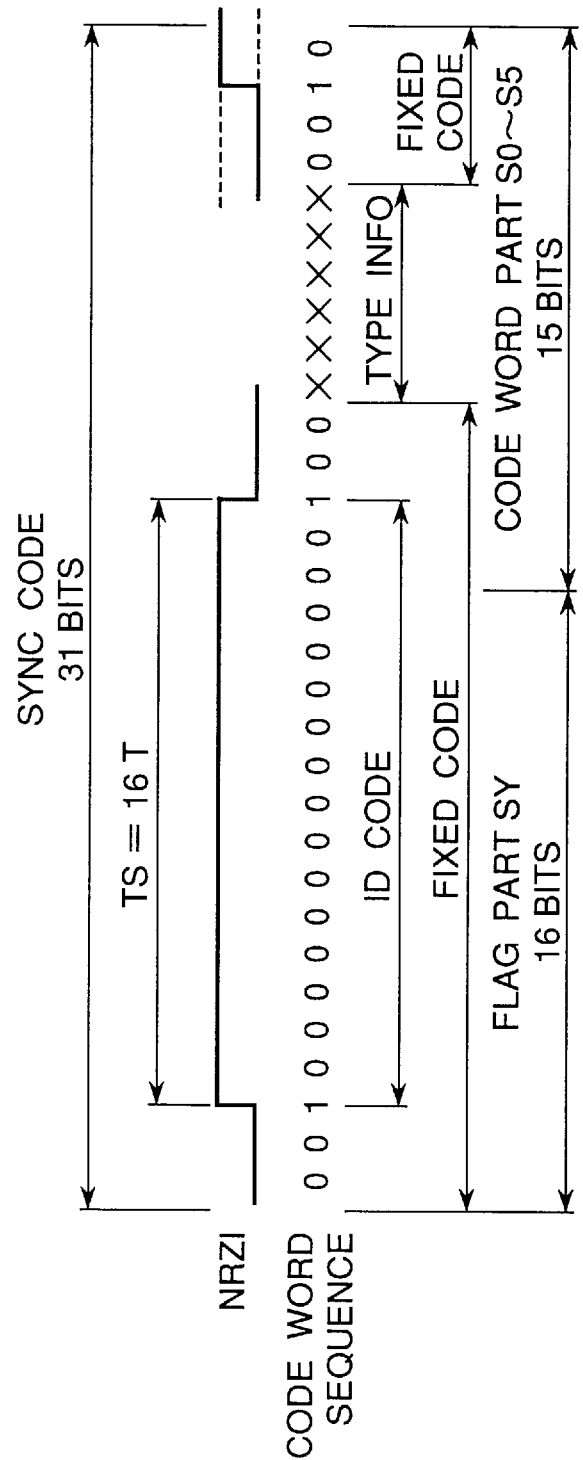
FIG. 16 is a diagram showing the data structure of the synchronization codes SYS0–SYS5 in an alternative embodiment of the invention.

FIG. 16 is used to describe the data structure of the synchronization codes SYS0–SYS5 in this embodiment of the invention. Note that in FIG. 16 "x" represents bits with a code value of either zero (0) or one (1).

The synchronization codes SYS0–SYS5 are 31-bit code sequences. As in the synchronization codes S1–S4 shown in FIG. 4, an identifier having an inversion interval TS=$T_{max}$+2T=16T in the corresponding NRZI channel signal is located from bit 3 to bit 19. The first 21 bits and the last 4 bits of each synchronization code SYS0–SYS5 are fixed strings common to each synchronization code SYS0–SYS5. Type information represented by two different patterns are inserted to the six bits from bit 22 to bit 27. Note, also, that in FIG. 15 the first 16 bits of the synchronization codes SY0–SYS5 are referred to as the flag part SY, and the last 15 bits are the code word parts S0–S5.

FIG. 17 is another data table showing the type information of the synchronization codes according of the present embodiment, and the read values of the corresponding code words.

As described above, it is not possible to determine the location in the block of the frame following any synchronization code using only the one synchronization code SYS0–SYS5, and the type information 1 and 2 of the synchronization codes SYS0–SYS5 therefore simply identify the type (i.e., usage) of the synchronization code.

As shown in the table in FIG. 6, the type information of synchronization codes SYS0–SYS5 are 6-bit patterns containing an odd (type information 1) or even (type information 2) number of 1s. As in the first embodiment above, type information 1 or 2 is selected to obtain the smallest absolute value of the DSV calculated at the predetermined DSV comparison position in the frame following the synchronization code SYS0–SYS5, and is inserted to bits 22–27 in the bit sequence of the synchronization code SYS0–SYS5. The code word parts S0–S5 containing the type information can also be read in the same manner as the other code words after detecting the identifier of the synchronization code SYS0–SYS5. If the value of the read code word part is, for example, 119 or 138, the synchronization code is known to be synchronization code SYS0. The type of the other synchronization codes SYS1–SYS5 can be determined in the same way.

In addition to the effects achieved by the first embodiment above, it is therefore possible by means of the present embodiment to determine the position of a given frame within the sector. As a result, if reading starts from some midpoint in any sector in the target block accessed, data can be read immediately into memory from the accessed frame to the end of the last sector in the block, and the remaining data from the beginning of the block to the initially accessed frame can then be read and written to memory before the previously buffered data, thus enabling all data in the target block to be read in a short time.

It should be noted that the arrangement of the synchronization codes SYS0–SYS5 shown in FIG. 15 shall not be limited to those shown. Specifically, any arrangement whereby the sum of two consecutive type numbers can identify whether the frame following the second type number is frame 1 or frame 2, and whereby no pattern of three consecutive type numbers appears more than once in any sector, can be used. Calculation methods other than addition may also be used. Furthermore, insofar as no pattern of three consecutive type numbers appears more than once in any sector, patterns of two consecutive type numbers, or patterns of four consecutive type numbers, can be used.

The 6-bit patterns of type information 1 and 2 shall also not be limited to the patterns shown in FIG. 17, and the correlation between synchronization code types S0–S5 shall also not be limited to those shown in FIG. 17.

The present invention has the following advantageous effects.

It is possible by the present invention to provide a recording medium to which is recorded a code word sequence containing a particular synchronization code whereby the synchronization codes contained in the data written to the recording medium can be identified and frame synchronization can be achieved by detecting the identifier codes identifying the synchronization codes, and information of which the type is expressed by the synchronization code and which expresses something other than the synchronization code can be obtained by reading the type information code following the identifier code.

It is possible by the first aspect of the present invention to provide a recording medium to which is recorded a code word sequence containing a particular synchronization code whereby the location of the synchronization code in the data block can be known by reading the type information code.

It is possible by the second aspect of the present invention to provide a recording medium to which is recorded a code word sequence containing a particular synchronization code whereby the synchronization code can be discriminated from the code word sequence of non-synchronization codes by means of the particular pattern of the identifier code, the code word formed containing the type information code can be read as one code word of the code word group, and the location of the synchronization code in the data block expressed by that type information code can be known, without requiring a special data structure for reading the type information code, if the information expressed by the type information code, and the information expressed by the code word formed containing said type information code, are recorded with a particular correspondence therebetween.

It is possible by the third aspect of the present invention to provide a recording medium to which is recorded a code word sequence containing a particular synchronization code whereby the location of the synchronization code in the data block can be known by reading the type information code, and which is selected to achieve the least bias in the dc component of the reproduction signal reproduced from the recording medium of the invention.

It is possible by the fourth aspect of the present invention to provide a recording medium to which is recorded a code word sequence containing a particular synchronization code whereby the frame containing the sector address information can be easily determined by reading the type information code of the synchronization code. It is therefore possible to access a particular block at high speed by simply reading only the type information code of the synchronization code and the address information, and code word sequences containing the synchronization code can be read from some midpoint in the desired block.

It is possible by the fifth aspect of the present invention to provide a recording method for recording to a recording medium a code sequence containing a synchronization code whereby the identifier code identifies the synchronization code from the code word sequences containing non-synchronization code information, and the type information code indicating the synchronization code type is selected according to the synchronization code insertion position and can also be used to express information other than identifying the synchronization codes.

It is possible by the sixth aspect of the present invention to provide a recording method for writing to a recording medium a code word sequence containing a particular synchronization code whereby the synchronization code can be discriminated from the code word sequence of non-synchronization codes by means of the particular pattern of the identifier code, the code word formed containing the type information code can be read as one code word of the code word group, and the location of the synchronization code in the data block expressed by that type information code can be known, without requiring a special data structure for reading the type information code, if the information expressed by the type information code, and the information expressed by the code word formed containing said type information code, are recorded with a particular correspondence therebetween.

It is possible by the seventh aspect of the present invention to provide a recording method for writing to a recording medium a code word sequence containing a particular synchronization code whereby the location of the synchronization code in the data block can be known by reading the type information code, and which is selected to achieve the least bias in the dc component of the reproduction signal reproduced from the recording medium of the invention.

It is possible by the eighth aspect of the present invention to provide a recording method for writing to a recording medium a code word sequence containing a particular synchronization code whereby the frame containing the sector address information can be easily determined by reading the type information code of the synchronization code. It is therefore possible to access a particular block at high speed by simply reading only the type information code of the synchronization code and the address information, and code word sequences containing the synchronization code can be read from some midpoint in the desired block.

It is possible by the ninth aspect of the present invention to provide a reproduction method for accurately discriminating the synchronization codes, and synchronizing the read clock to the code words, based on a code word sequence containing a particular synchronization code written to a recording medium according to the first aspect. It is also possible to selectively read information recorded immediately following the synchronization code by thus determining the location of information recorded immediately following the synchronization code in the data block.

It is possible by the tenth aspect of the present invention to provide a reproduction method for accurately discriminating the synchronization codes, and synchronizing the read clock to the code words, based on the particular pattern of the identifier code. It is also possible to selectively read information recorded immediately following the synchronization code by reading the code word formed containing the type information code as one code word of the code word group, and determining the location of information recorded immediately following the synchronization code in the data block.

It is possible by the eleventh aspect of the present invention to provide a reproduction method for easily determining from the data recorded to a recording medium according to the fourth aspect the frames containing address information based on the type information codes of the synchronization codes. It is therefore possible to access a particular block at high speed by simply reading only the type information code of the synchronization code and the address information, and code word sequences containing the synchronization code can be read from some midpoint in the desired block.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An article of manufacture, comprising:
    a reproducer usable recording medium having a reproducer readable channel signal embodied therein, said reproducer readable channel signal in said article of manufacture comprising:
    synchronization codes provided along a track of said recording medium with an interval between two synchronization codes; and
    data codes filled in said interval between two synchronization codes, said data codes comprising a sequence of code words,
    said synchronization codes comprising an identifier having a particular pattern distinguishable from any data in said data codes, and a type information code representing a type of synchronization code,
    said channel signal being generated in a sequence of said synchronization codes and said data codes.

2. An article of manufacture according to claim 1, wherein said type information code comprises a code specifying a location of a corresponding synchronization code in a data block.

3. An article of manufacture according to claim 2, wherein said type information code has a pattern such that a code pattern of a code segment starting from a particular position in said code and said type information code is identical to a code pattern of one code word of said code words.

4. An article of manufacture according to claim 2, wherein said type information code comprises type information code selected from a plurality of type information codes expressing a same type, but resulting in a smallest bias in a dc component of a channel signal before and after said corresponding synchronization code.

5. An article of manufacture according to claim 2, wherein said data block is divided into a plurality of sectors, each sector of said plurality of sectors having a plurality of frames, a sector address being provided in a particular frame in each sector, said type information code identifying a frame containing a sector address being contained in a synchronization code inserted before said frame containing said sector address.

6. A method for recording a sequence of code words to a recording medium, a plurality of code words forming a frame, a plurality of frames forming a data block, comprising:
    inserting a synchronization code at a beginning of the data block and at preselected places in the data block;
    adding an identifier code to each synchronization code to discriminate the synchronization code from other codes in the data block;
    adding a type information code to each synchronization code to indicate a type of synchronization code, based on a position in the data block where the synchronization code is inserted;

generating a channel signal from the data blocks to which the synchronization codes have been inserted; and recording the channel signal.

7. A recording method according to claim 6, wherein the adding of the identifier code to each synchronization code comprises generating the identifier code having a code pattern different from any code pattern of the code words, and wherein the adding of the type information code to each synchronization code comprises generating the type information code such that a code pattern of a code segment starting from a particular position in the identifier code, and including the type information code, is identical to a code pattern of one of the code words.

8. A recording method according to claim 6, wherein the type information code comprises type information code selected from a plurality of type information codes expressing a same type, while resulting in a smallest bias in a dc component of the channel signal before the synchronization code and after the synchronization code.

9. A recording method according to claim 6, wherein the data block is divided into a plurality of sectors, each sector having a plurality of frames, a sector address being provided in a particular frame in each sector; type information code identifying the frame containing a sector address being contained in the synchronization code inserted before the frame containing the sector address.

10. A recording apparatus for recording a channel signal generated in a sequence of code words to a recording medium, in which a plurality of code words form a frame and a plurality of frames form a data block, said apparatus comprising:

inserting means for inserting a synchronization code at a beginning of said data block and at preselected places in said data block;

first adding means for adding an identifier code to each synchronization code for discriminating the synchronization code from other codes in the data block;

second adding means for adding a type information code to each synchronization code to indicate a type of synchronization code, based on a position in the data block where the synchronization code is inserted; and outputting means for outputting a channel signal generated in the data block to which the synchronization code has been inserted for recording to said recording medium.

11. A recording apparatus according to claim 10, wherein said first adding means comprises generating means for generating said identifier code with a code pattern different from any code pattern of said code words, and wherein said second adding means comprises generating means for generating said type information codes such that a code pattern of a code segment starting from a particular position in the identifier codes and including the type information code, is identical to a code pattern of one of the code words.

12. A recording apparatus according to claim 10, wherein said type information code is selected from a plurality of type information codes expressing a same type, but which results in a smallest bias in a dc component of a channel signal before said synchronization code and after said synchronization code.

13. A recording apparatus according to claim 10, wherein said data block is divided into a plurality of sectors, each sector having a plurality of frames, a sector address being provided in a particular frame in each sector; said type information code identifying said frame containing said sector address being contained in said synchronization code inserted before said frame containing said sector address.

14. A method for reproducing information from a recording medium storing synchronization codes provided along a track with an interval between two synchronization codes, and data codes filled in said interval between two synchronization codes, said data codes comprising a sequence of code words, the synchronization code comprising an identifier having a particular pattern distinguishable from any data in said data codes, and type information code that specifies a location of a corresponding synchronization code in a data block, said method comprising:

(a) detecting said synchronization code by detecting said identifier; and (b) reading said type information code in said synchronization code to specify a location of said synchronization code and to later specify the data codes following said synchronization code in the data block.

15. A reproduction method according to claim 14, further comprising arranging the type information code such that a code pattern of a code segment starting from a particular position in the identifier code, and including the type information code, is identical to a code pattern of one of the code words, wherein reading of the type information code includes reading a code word pattern.

16. A reproduction method according to claim 14, further comprising dividing the data block into a plurality of sectors, each sector having a plurality of frames, a sector address being provided in a particular frame in each sector; the type information code identifying the frame containing the sector address being contained in the synchronization code inserted before the frame containing the sector address, and further comprising reading the sector address.

17. A reproduction apparatus for reproducing information from a track of a recording medium, said recording medium storing synchronization codes provided along said track with an interval between two synchronization codes, and data codes filled in said interval between said two synchronization codes, said data codes comprising a sequence of code words, said synchronization codes comprising an identifier having a particular pattern distinguishable from any data in said data codes, and type information code specifying a location of a corresponding synchronization code in a data block, said apparatus comprising:

detecting means for detecting said synchronization code by detecting said identifier; and reading means for reading said type information code in said synchronization code to specify the location of said synchronization code, and to later specify said data codes following said synchronization code in said data block.

18. A reproduction apparatus according to claim 17, wherein said type information code is arranged such that a code pattern of a code segment starting from a particular position in the identifier code and including the type information code is identical to a code pattern of one of the code words, and wherein said reading means reads a code word pattern.

19. A reproduction apparatus according to claim 17, wherein said data block is divided into a plurality of sectors, each sector having a plurality of frames, a sector address being provided in a particular frame in each sector; said type information code identifying a frame containing the sector address being contained in the synchronization code inserted before the frame containing the sector address, said apparatus further comprising means for reading the sector address.

20. An apparatus for recording a channel signal to a recording medium, said channel signal being generated in a sequence of code words, in which a plurality of code words form a frame and a plurality of frames form a data block, said apparatus comprising:

an inserter that inserts a synchronization code at a beginning of said data block and at preselected places in said data block;

a first adder that adds an identifier code to each synchronization code to enable said synchronization code to be discriminated from other codes in said data block;

a second adder that adds a type information code to each synchronization code to indicate said type of synchronization code, based on a position in said data block where said synchronization code is inserted; and an outputter that outputs a channel signal, generated in said data block to which said synchronization code has been inserted, for recording to said recording medium.

21. The apparatus of claim 20, wherein said first adder comprises a first generator that generates said identifier code with a code pattern different from any code pattern of said code words.

22. The apparatus of claim 21, wherein said second adder comprises a second generator that generates said type information code, such that a code pattern of a code segment starting from a particular position in said identifier code, including said type information code, is identical to a code pattern of one of said code words.

23. The apparatus of claim 20, wherein said type information code is selected from a plurality of type information codes expressing a same type, but which results in a smallest bias in a dc component of a channel signal before said synchronization code and after said synchronization code.

24. The apparatus of claim 20, wherein said data block is divided into a plurality of sectors.

25. The apparatus of claim 24, wherein each sector of said plurality of sectors has a plurality of frames, a sector address being provided in a particular frame in each sector.

26. The apparatus of claim 25, wherein said type information code identifying said frame containing said sector address is contained in said synchronization code inserted before said frame containing said sector address.

27. An apparatus for reproducing information from a track of a recording medium, said recording medium storing synchronization codes along said track with an interval between two synchronization codes, data codes located in said interval between said two synchronization codes, said data codes comprising a sequence of code words, said synchronization codes comprising an identifier having a particular pattern distinguishable from any data in said data codes, and type information code specifying a location of a corresponding synchronization code in a data block, comprising:

a detector that detects said synchronization code in said data block by detecting said identifier; and a reader that reads said type information code in said synchronization code to specify a location of said synchronization code, and to specify said data codes following said synchronization code in said data block.

28. The apparatus of claim 27, wherein said type information code is arranged such that a code pattern of a code segment starting from a particular position in said identifier code and including said type information code is identical to a code pattern of one code word of said code words, said reader reading a code word pattern.

29. The apparatus of claim 27, wherein said data block is divided into a plurality of sectors.

30. The apparatus of claim 29, wherein each sector, of said plurality of sectors, has a plurality of frames, a sector address being provided in a particular frame in each sector.

31. The apparatus of claim 30, wherein said type information code identifying a frame containing said sector address is contained in said synchronization code inserted before said frame containing said sector address.

32. An apparatus for recording a channel signal to a recording medium, comprising:

a synchronization code inserter that inserts a synchronization code at predetermined locations in a data block formed from a plurality of code words;

an identifier code adder that adds an identifier code to each synchronization code;

an information type code adder that adds a type information code to each synchronization code; and an outputter that outputs a channel signal, generated in said data block to which said synchronization code has been inserted, for recording to said recording medium.

33. The apparatus of claim 32, wherein said identifier code enables said synchronization code to be distinguished from other codes in said data block.

34. The apparatus of claim 32, wherein said type information code indicates said type of synchronization code.

35. The apparatus of claim 34, wherein said type of synchronization code is determined based on a position in said data block where said synchronization code is inserted.

* * * * *

UNITED STATES PATENT AND TRADEMARK OFFICE
CERTIFICATE OF CORRECTION

PATENT NO. : 5,881,037
DATED : March 9, 1999
INVENTOR(S) : S. TANAKA, et al.

It is certified that error appears in the above-identified patent and that said Letters Patent is hereby corrected as shown below:

On the title page, in section [22], change "Jul. 1, 1997" to —Jul. 3, 1997—.

On the title page, in section [57], "ABSTRACT", line 11, change "is" to —1s—.

At column 31, line 51 (claim 11, line 6), change "codes" to —code,—.

At column 31, line 53 (claim 11, line 8), change "codes" to —code,—.

On the title page, in section [73], "Assignees", change "Kabushiki Kaisha Toshiba, Kanagawa; Matsushita Electric Industrial Co., Ltd., Osaka, both of Japan" to —Matsushita Electric Industrial Co., Ltd., Osaka; Kabushiki Kaisha Toshiba, Kanagawa, Kanagawa, both of Japan—.

Signed and Sealed this

Sixth Day of July, 1999

Attest:

Q. TODD DICKINSON

Attesting Officer

Acting Commissioner of Patents and Trademarks